US007530017B2

(12) United States Patent
Kinno et al.

(10) Patent No.: US 7,530,017 B2

(45) Date of Patent: May 5, 2009

(54) DOCUMENT TRANSFORMATION SYSTEM

(75) Inventors: Akira Kinno, Yokohama (JP); Hideki Yukitomo, Yokohama (JP); Takehiro Nakayama, Yokohama (JP); Atsushi Takeshita, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 489 days.

(21) Appl. No.: 10/940,802

(22) Filed: Sep. 15, 2004

(65) Prior Publication Data

US 2005/0097454 A1 May 5, 2005

(30) Foreign Application Priority Data

Sep. 24, 2003 (JP) ............................ 2003-332389

(51) Int. Cl.
*G06F 17/00* (2006.01)

(52) U.S. Cl. ...................................... 715/249; 715/235

(58) Field of Classification Search ................. 715/513, 715/523, 235, 249
See application file for complete search history.

(56) References Cited

U.S. PATENT DOCUMENTS

| | | | | |
|---|---|---|---|---|
| 6,487,566 | B1 | 11/2002 | Sundaresan | |
| 6,643,652 | B2 * | 11/2003 | Helgeson et al. | 707/10 |
| 7,111,076 | B2 * | 9/2006 | Abjanic et al. | 709/246 |
| 7,130,861 | B2 * | 10/2006 | Bookman et al. | 707/102 |
| 7,146,565 | B2 * | 12/2006 | Toyama et al. | 715/513 |
| 2001/0051962 | A1 * | 12/2001 | Plotkin | 707/522 |
| 2004/0148571 | A1 * | 7/2004 | Lue | 715/514 |

(Continued)

FOREIGN PATENT DOCUMENTS

EP 1 122 655 A2 8/2001

(Continued)

OTHER PUBLICATIONS

Pietriga, Emmanuel, et al, "Transformations and Experiences: VXT: A Visual Approach to XML Transformations", Proceedings of the 2001 ACM Symposium on Document Engineering DocEng '01, Nov. 2001, pp. 1-10.*

(Continued)

*Primary Examiner*—Laurie Ries
(74) *Attorney, Agent, or Firm*—Oblon, Spivak, McClelland, Maier & Neustadt, P.C.

(57) ABSTRACT

A document transformation system comprises: template storing means for storing structure information having a specific pattern, as a template; template match detecting means for importing the structure information forming the structured document, and transformation location information indicating a transformation location of the structure information, and for detecting a match portion between the structure information and the template, excepting the transformation location indicated by the transformation location information, from objects of detection, in the structure information; template replacing means for importing the structure information forming the structured document, and match information indicating the match portion, for replacing the match portion indicated by the match information, in the structure information with the template, and for outputting replaced structure information; and transforming means for importing the character string information forming the structured document, the replaced structure information, and a transformation rule for transformation of the structure information and character string information forming the structured document, for transforming the replaced structure information and the character string information thus imported, according to the transformation rule, and for outputting transformed structure information and transformed character string information.

11 Claims, 28 Drawing Sheets

U.S. PATENT DOCUMENTS

| | | | | |
|---|---|---|---|---|
| 2004/0205448 | A1* | 10/2004 | Grefenstette et al. | 715/500 |
| 2006/0080314 | A1* | 4/2006 | Hubert et al. | 707/5 |

FOREIGN PATENT DOCUMENTS

| | | |
|---|---|---|
| JP | 2002-163248 | 6/2002 |
| JP | 2002-342316 | 11/2002 |
| JP | 2003-44459 | 2/2003 |

OTHER PUBLICATIONS

Myllymaki, Jussi, "Effective Web Data Extraction With Standard XML Technologies", Proceedings of the 10th International Conference on World Wide Web WWW '01, Apr. 2001, pp. 689-696.*

Hardy, Matthew R., et al, "Structure and Transformation of Documents: Mapping and Displaying Structural Transformations Between XML and PDF", Proceedings of the 2002 ACM Symposium on Document Engineering DocEng '02, Nov. 2002, pp. 95-102.*

Hartmut Liefke, et al., "XMill: An Efficient Compressor for XML Data", In proceedings of ACM SIGMOD International Conference on Management of Data, 2000, pp. 1-26.

Jacob Ziv, et al., "A Universal Algorithm for Sequential Data Compression", IEEE Transactions on Information Theory, vol. IT-23, No. 3, May 1977, pp. 337-343.

Compact HTML for Small Information Appliances, http://www.w3.org/TR/1998/NOTE-CompactHTML-19980209/, Feb. 2, 1998, pp. 1-12.

"Xerces2 Java Parser Readme", http://xml.apache.org/xerces2-j/.

Mathias Neumüller, et al, "Improving XML Processing Using Adapted Data Structures" Lecture Notes in Computer Science, vol. 2593, 2002, pp. 206-220.

Jyrki Katajainen, et al., "Tree Compression and Optimization with Applications", International Journal of Foundations of Computer Science, XP002329903, vol. 1, No. 4, 1990, 2 pages.

Hartmut Liefke, et al., "XMill: an Efficient Compressor for XML Data" ACM Proceedings of SIGMOD. International Conference on Management of Data, XP002168802, vol. 29, No. 2, May 2000, pp. 153-154.

* cited by examiner

Fig.2

```
<A>
  <B>
    <C>abcd</C>
    <D>
      <F>
        <K>efgh</K>
        <K>ijk</K>
      </F>
      <G>
        <K>lmn</K>
      </G>
    </D>
  </B>
  <B>
    <E>
      <H>
        <L>opqr</L>
        <L>stuv</L>
      </H>
      <I>
        <L>wxyz</L>
      </I>
    </E>
  </B>
</A>
```

XML DOCUMENT 10

(a)

13

| | | |
|---|---|---|
| 301 | E | A |
| 302 | E | B |
| 303 | E | B |
| 304 | E | C |
| 305 | E | D |
| 306 | E | E |
| 307 | T | abcd |
| 308 | E | F |
| 309 | E | G |
| 310 | E | H |
| 311 | E | I |
| 312 | E | K |
| 313 | E | K |
| 314 | E | K |
| 315 | E | L |
| 316 | E | L |
| 317 | E | L |
| 318 | T | efgh |
| 319 | T | ijk |
| 320 | T | lmn |
| 321 | T | opqr |
| 322 | T | stuv |
| 323 | T | wxyz |

| | | |
|---|---|---|
| 301 | E | A |
| 302 | E | B |
| 303 | E | B |
| 304 | E | C |
| 305 | E | D |
| 306 | E | E |
| 307 | T | abcd |
| 308 | E | F |
| 309 | E | G |
| 310 | E | H |
| 311 | E | I |
| 313 | E | K |
| 314 | E | K |
| 315 | E | L |
| 316 | E | L |
| 317 | E | L |
| 319 | T | ijk |
| 320 | T | lmn |
| 321 | T | opqr |
| 322 | T | stuv |
| 323 | T | wxyz |
| 801 | E | J |
| 802 | E | K |
| 803 | E | K |
| 804 | E | K |
| 805 | T | 123 |
| 806 | T | 456 |
| 807 | T | 789 |

| | |
|---|---|
| 305 | 3 |
| 312 | 11 |
| 315 | 1 |

```
<?xml version="1.0"?>
<xsl:stylesheet version="1.0" xmlns:xsl="http://www.w3.org/1999/XSL/Transform">
<xsl:template match="*|@*">
  <xsl:copy>
    <xsl:apply-templates select="@*|*|text()" />
  </xsl:copy>
</xsl:template>
<xsl:template match="/A/B/D/F">        ~121a
  <J>
    <K>123</K>
    <K>456</K>                          121b
    <K>789</K>
  </J>
</xsl:template>
</xsl:stylesheet>
```

TRANSFORMATION RULE 114

```
<transform  match ="312">
```
| EMPLOYED TEMPLATE ID =2 | 308 313 805 806 807 | 801 802 803 804 |
|---|---|---|
| ENTITY ID=1 | | |

```
</transform>
```
REPLACED TRANSFORMATION RULE  171

(a)

(b)

DOCUMENT TRANSFORMATION SYSTEM

BACKGROUND OF THE INVENTION

1. Field of the Invention

The present invention relates to a document transformation system for transforming a structured document.

2. Related Background Art

Structured documents including XML (Extensible Markup Language) documents require description of structure information and character string information and thus generally have the feature of large data size (high data volume). For this reason, attention is recently being focused on technologies of compressing the structured documents, for purposes of effective utilization of a disk space for storage of structured documents and effective utilization of network resources.

Particularly, it is believed that the technology of separating a structured document into structure information and character string information and compressing them focuses attention on the structure information to decrease the number of occurring patterns, as compared with cases also including the character string information, and is thus able to achieve a higher compression rate than the compression by such technologies as LZ77 for simply compressing the structured document (reference should be made as to the details of LZ77 to "Jacob Ziv, Abraham Lempel: A Universal Algorithm for Sequential Data Compression. IEEE Transactions on Information Theory 23(3): 337-343 (1977)").

Japanese Patent Application Laid-Open No. 2003-44459 (hereinafter referred to as Document 1) discloses a method of separating internal representation data of structured data into structure information and character string information by using preliminarily given structure specification information and compressing them independently of each other. This compression method compresses the data with focus on the structure information to achieve improvement in the compression rate. In addition, a structured document is subjected to validation check and parsing of structure information as pre-processings. It is described that, because of the independent compression of the structure information and character string information, the validation check and parsing can be carried out by decompressing (or restoring) the structure information only, without decompressing (or restoring) the character string information.

Document "Hartmut Liefke and Dan Suciu.: "XMill: An Efficient Compressor for XML Data", In proceedings of ACM SIGMOD International Conference on Management of Data, 2000" (hereinafter referred to as Document 2) discloses a method of compressing an XML document by reusing partial structures appearing in the XML document. In this compression method, a structured document is separated into three information items: structure information, node type information, and text information, and each of them is compressed by an ordinary compression algorithm such as LZ77. According to this Document 2, since the compression is carried out with focus on the structure information, as in the case of the technology described in aforementioned Document 1, the compression rate can be raised. As described above, when the structured document is separated into the structure information and character string information to be independently compressed as in the conventional technologies, the compression rate is raised and the validation check and parsing can be carried out without decompression of the character string information.

SUMMARY OF THE INVENTION

On the other hand, for utilization of structured documents in mobile terminal equipment (e.g., cell phones and others) with only a small display, it is contemplated that the structured documents are transformed into a form suitable for the mobile terminal equipment to be used in that form. For example, an XHTML document is transformed into a c-HTML (Compact Hyper Text Markup Language) document suitable for the mobile terminal equipment. Reference should be made as to the details of c-HTML to "Compact HTML for small Information Appliance, http://www.w3.org/TR/1998/NOTE-CompactHTML-19980209/".

For transformation of the structured documents, however, it is necessary to transform both the structure information and the character string information. If a structured document is compressed by an algorithm such as LZ77, as in the aforementioned conventional technology, prior to the transformation, the structure information and the character string information all must be once decompressed for transforming the structured document, and this raises a problem of increase in both time and memory quantity necessary for the transformation process.

The present invention has been accomplished in order to solve the above problem, and an object of the invention is therefore to provide a document transformation system for performing compression and transformation of a structured document, without need for decompression of entire structure information in the transformation, so as to achieve efficient compression and transformation.

In order to solve the above problem, the present invention provides a document transformation system for transforming a structured document having structure information and character string information, comprising: template storing means for storing structure information having a specific pattern, as a template; template match detecting means for importing the structure information forming the structured document, and transformation location information indicating a transformation location of the structure information, and for detecting a match portion between the structure information and the template, excepting the transformation location indicated by the transformation location information, from objects of detection, in the structure information; template replacing means for importing the structure information forming the structured document, and match information indicating the match portion, for replacing the match portion indicated by the match information, in the structure information with the template, and for outputting replaced structure information; and transforming means for importing the character string information forming the structured document, the replaced structure information, and a transformation rule for transformation of the structure information and character string information forming the structured document, for transforming the replaced structure information and the character string information thus imported, according to the transformation rule, and for outputting transformed structure information and transformed character string information. Since this document transformation system is configured to replace the match portion in the structure information with the template excepting the transformation location indicated by the transformation location information, the transforming means does not have to perform a process of returning the structure information into a state before the replacement.

The document transformation system is preferably constructed in a configuration wherein the transformation rule comprises a transformation location identifier and wherein the document transformation system further comprises: transformation location detecting means for detecting the transformation location identifier as the transformation location information from the transformation rule, and for feeding the transformation location identifier thus detected, to the match detecting means. In this configuration, the match portion can be detected using the transformation location information obtained from the input transformation rule.

Furthermore, the document transformation system can also be constructed in a configuration wherein the transformation rule comprises a transformation location identifier, and wherein the document transformation system further comprises: transformation rule storing means for storing the transformation location identifier in the transformation rule; and transformation location detecting means for detecting the transformation location information, according to a frequency of use of the transformation location identifier stored in the transformation rule storing means. The document transformation system may also be constructed in a configuration wherein the transformation rule comprises a transformation location identifier and wherein the document transformation system further comprises: transformation rule storing means for storing the transformation location identifier in the transformation rule; and transformation location detecting means for detecting the transformation location identifier stored in the transformation rule storing means, as the transformation location information. In either of the document transformation systems, the transformation location information can be fed to the match detecting means before input of the transformation rule into the transforming means.

In any one of the above document transformation systems, preferably, the transformation rule comprises a transformed, structured document, and the document transformation system further comprises: template discovering means for extracting structure information of the transformed, structured document from the transformation rule, and for making the template storing means store the structure information as the template. This permits the discovering means to discover a template at every input of a transformation rule and automatically add the new template into the storing means, so as to update the storing means.

This document transformation system is preferably constructed in a configuration further comprising template verifying means for determining whether it is necessary to store the template discovered by the template discovering means, wherein the template discovering means stores the template, according to a determination made by the template verifying means. This document transformation system is able to except a template that does not have to be stored, from objects of storage.

In the case of this document transformation system, the template verifying means is able to determine whether it is necessary to store the template, based on whether a template of the same type as the template discovered by the template discovering means is stored in the template storing means. This permits the system to except a template of the same type as a stored template, without storing it.

Furthermore, in any one of the above document transformation systems, preferably, the template match detecting means detects a match portion between the transformed structure information and the template, and the template replacing means replaces the match portion indicated by the match information outputted from the template match detecting means, with the template. The document transformation system of this configuration again applies the template to the transformed structure information, whereby it can perform the compression while further reducing the data volume.

The present invention further provides a document transformation system for transforming a structured document having structure information and character string information, comprising: template storing means for storing structure information having a specific pattern, as a template; transformation rule template replacing means for importing a transformation rule comprising a transformed, structured document, for transformation of the structure information and character string information forming the structured document, for extracting structure information of the transformed, structured document from the transformation rule, for detecting the template matching the structure information, and for outputting a replaced transformation rule in which the structure information is replaced with the detected template; and transforming means for importing the structure information and character string information forming the structured document, and the replaced transformation rule, for transforming the structure information and character string information thus imported, according to the replaced transformation rule, and for outputting transformed structure information and transformed character string information. In this document transformation system, the structure information of the transformed, structured document in the replaced transformation rule is previously replaced with the template, and therefore the transformation with the replaced transformation rule by the transforming means results in automatically applying the template, so as to effect the compression at the same time as the transformation.

The document transformation system can also be constructed in a configuration wherein the transformation rule template replacing means detects an approximate template with a smallest difference from the structure information of the transformed, structured document, extracts difference information indicating the difference, and replaces the replaced transformation rule with the difference information and the approximate template. By using such an approximate template, it becomes feasible to efficiently use the template.

Furthermore, the present invention provides a document transformation system for transforming a structured document having structure information and character string information, comprising: template storing means for storing structure information having a specific pattern, as a template; template match detecting means for importing the structure information forming the structured document, and transformation location information indicating a transformation location of the structure information, and for detecting a match portion between the structure information and the template, excepting the transformation location indicated by the transformation location information, from objects of detection, in the structure information; template replacing means for importing the structure information forming the structured document, and match information indicating the match portion, for replacing the match portion indicated by the match information, in the structure information with the template, and for outputting replaced structure information; transformation rule template replacing means for importing a transformation rule comprising a transformed, structured document, for transformation of the structure information and character string information forming the structured document, for extracting structure information of the transformed, structured document from the transformation rule, for detecting the template matching the structure information, and for outputting a replaced transformation rule in which the structure information is replaced with the detected template; and transforming means for importing the character string information forming the structured document, the replaced structure information, and the replaced transformation rule, for transforming the replaced structure information and the character string information thus imported, according to the replaced transformation rule, and for outputting transformed structure information and transformed character string information. In this document transformation system, the template stored in the storing means can be used as a template for replacement of the structure information and for replacement of the transformation rule.

The document transformation systems according to the present invention are configured to perform the transformation and compression of structured documents such as the XML documents, and are able to efficiently perform the compression and transformation, without need for decompression of structure information, and thus to increase the processing speed of document transformation.

BRIEF DESCRIPTION OF THE DRAWINGS

FIG. 2 is a diagram showing an XML document.

FIG. 13 is a diagram showing another table with a list of character string information as an example of second output data.

FIG. 15 is a diagram showing an example of a table indicating transformation location identifiers stored in the transformation rule storage of FIG. 14.

FIG. 16 is a diagram showing an example of another transformation rule.

DESCRIPTION OF THE PREFERRED EMBODIMENTS

Embodiments of document transformation systems according to the present invention will be described below in detail with reference to the accompanying drawings.

First Embodiment

Figure 1:
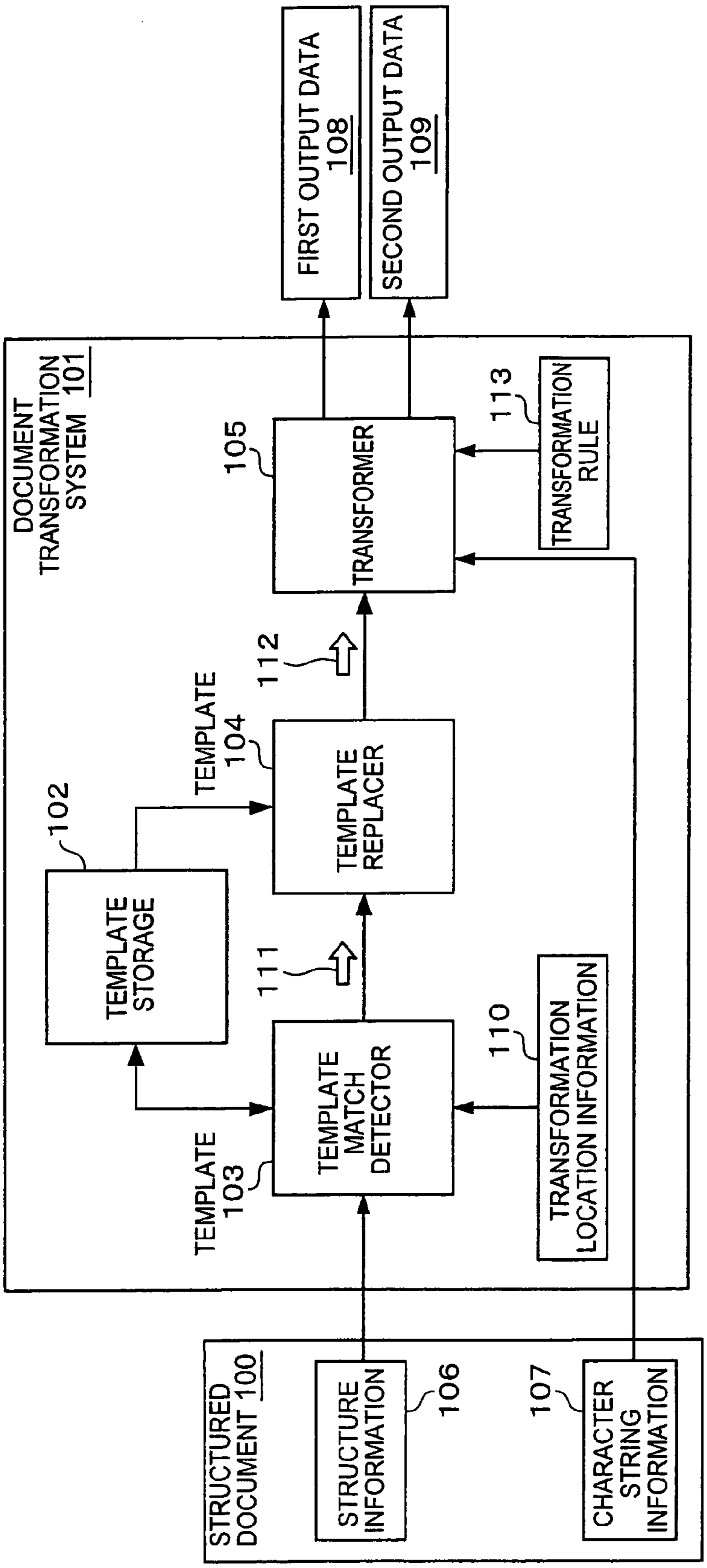
FIG. 1 i s a block diagram showing a configuration of a document transformation system according to the first embodiment of the present invention.

FIG. 1 is a block diagram showing a configuration of a document transformation system 101 according to the first embodiment of the present invention. The document transformation system 101 has a template storage (hereinafter referred to as "storage") 102, a template match detector (hereinafter referred to as "match detector") 103, a template replacer (hereinafter referred to as "replacer") 104, and a transformer 105. This document transformation system 101 is configured to import structure information 106 and character string information 107 of a structured document 100 and to output first output data 108 and second output data 109.

Figure 3:
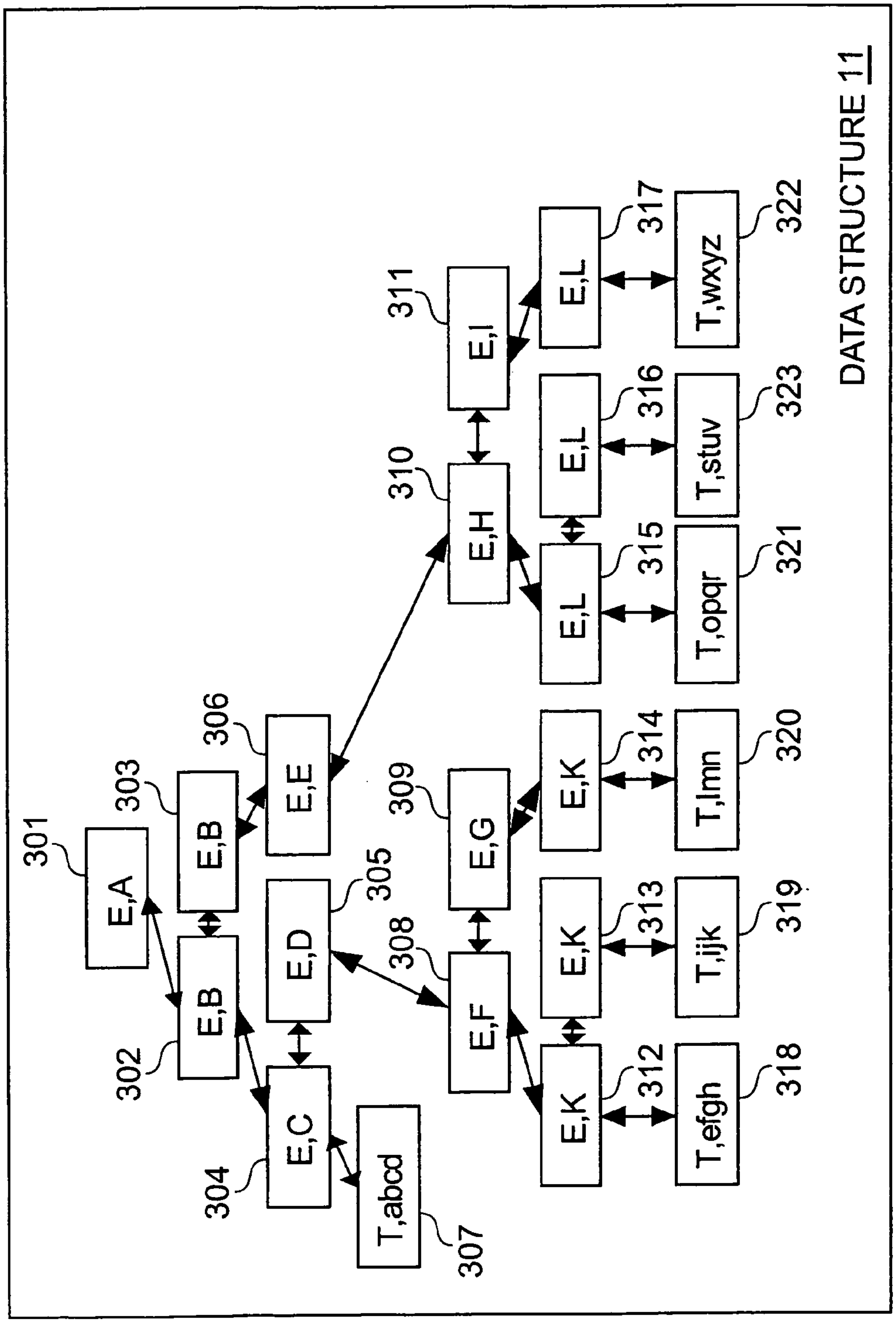
FIG. 3 is a diagram showing a data structure of the XML document.

The input structured document 100 will be described below. FIG. 2 is a diagram showing an XML document 10 as an example of the structured document 100. The structured document 100 can be any other object of input than the XML document 10 as long as it has the structure information and character string information like the XML document 10 and these can be separated. FIG. 3 shows a data structure 11 obtained by parsing the XML document 10 described in FIG. 2, by a well-known technique (e.g., Xerces in http://xml.apache.org/xerces2-j/, or the like) to transform it into a format suitable for use inside a computer.

In FIG. 3, the data structure 11 has nodes (also called vertices) 301 to 322, and the nodes are connected by arrows. Each arrow indicates a reference relation between nodes. In the drawing, an arrow directed upward from a node indicates a meaning that a reference destination is a parent node (parent reference). An arrow directed downward from a node indicates a meaning that a reference destination is a child node (child reference). Furthermore, an arrow directed to the left from a node indicates a meaning that a reference destination is a previous sibling node (previous sibling reference), and an arrow directed to the right from a node a meaning that a reference destination is a next sibling node (next sibling reference).

Each node 301-323 contains a description of node type information and text information. The node type (also called type) information is described on the left of each node: "E" indicates that the node is an element node; "T" indicates that the node is a text node. The text information is described on the right of each node. When the node type information is "E", an element name is described in the text information. When the node type information is "T", a character string is described in the text information. For example, in the case of a node 302, the node type information on the left is "E", and thus the element name "B" is placed on the right. On the other hand, in the case of a node 307, the node type information on the left is "T", and thus a character string "abcd" is placed on the right.

Figure 4:
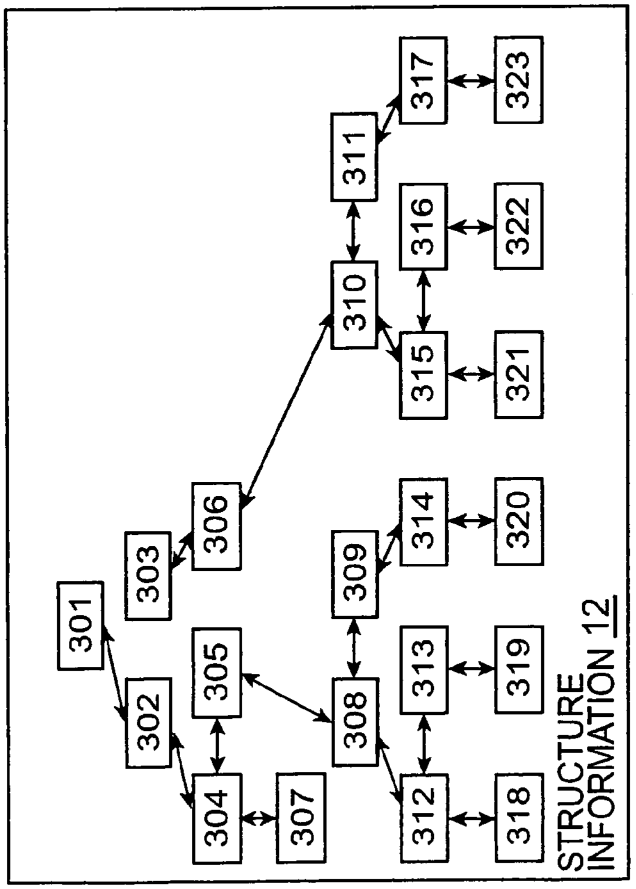
FIG. 4 is a diagram showing structure information separated from the data structure of FIG. 3, and a table of character string information at each of nodes.

Since the data structure 11 is managed as separated into the structure information, and information containing the node type information and the text information (hereinafter referred to as "character string information"), they can also be expressed as shown in FIG. 4(*a*) and in FIG. 4(*b*), respectively. FIG. 4(*a*) shows the structure information 12 separated from the data structure 11, and shows how each node is connected (connection relations of the respective nodes). On the other hand, FIG. 4(*b*) shows a table 13 with a list of character string information at each of the nodes (node type information or text information). When the document transformation system 101 in the first embodiment of the present invention imports the structured document 100, the structured document 100 is fed in a state in which structure information 106 such as the structure information 12 shown in FIG. 4(*a*) is separated from character string information 107 such as the character string information listed in the table 13 shown in FIG. 4(*b*).

Figure 5:
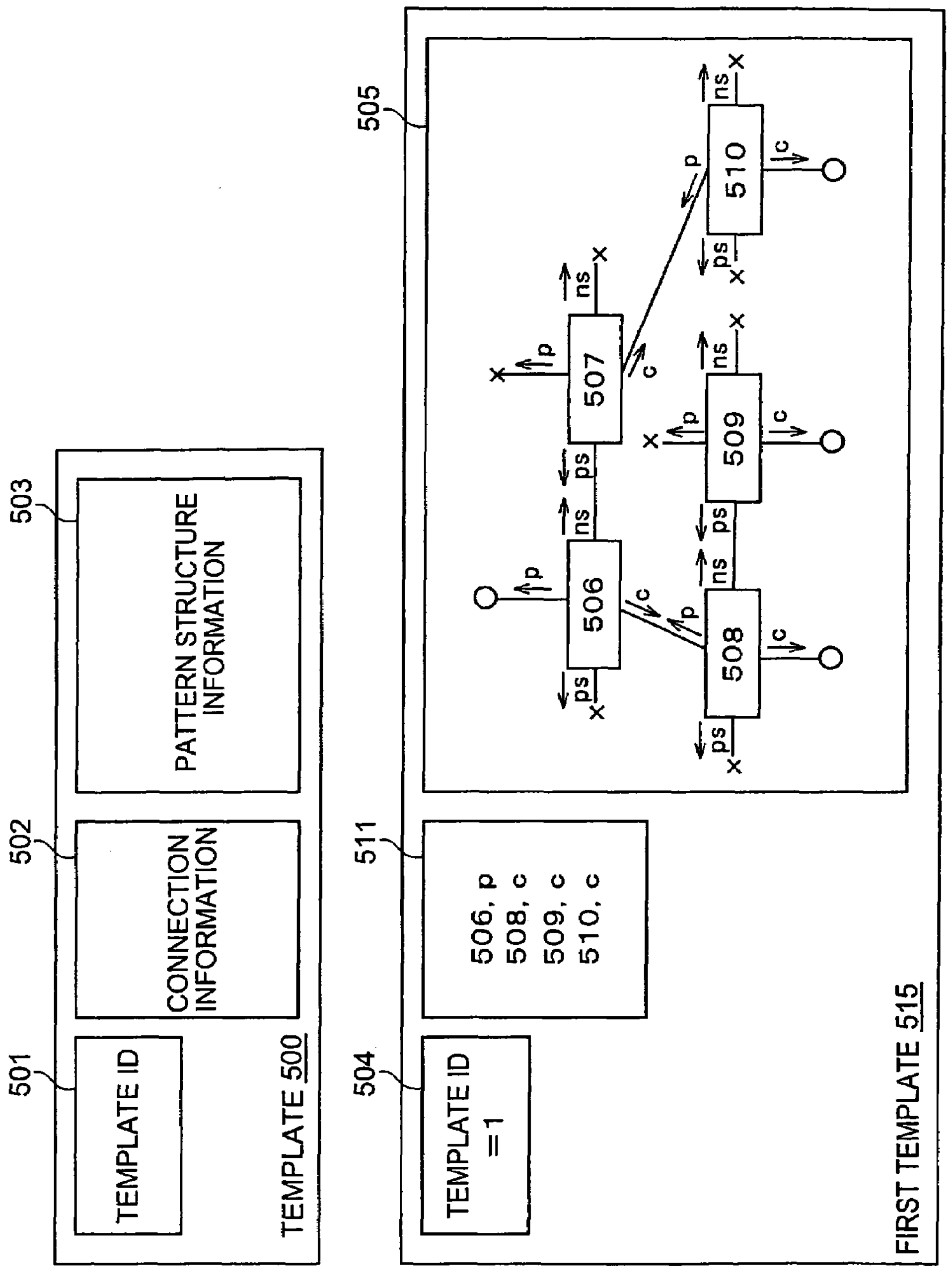
FIG. 5 is a diagram showing a configuration of template 500 and a configuration of first template 515.

The storage 102 stores a specific pattern preliminarily defined for structure information in structured documents, e.g., a pattern known as one appearing frequently, as a template. A configuration example of the template is shown in FIG. 5(*a*). A template 500 shown in FIG. 5(*a*) has a template ID 501, connection information 502, and pattern structure information 503. The template ID 501 indicates a template identifier (discrimination ID), and is used for uniquely discriminating each template, where the storage 102 stores a plurality of templates. The connection information 502 indicates external interfaces of the template, and contains information indicating how a pattern indicated by the template can be connected to another template or another node. The pattern structure information 503 indicates structure information of the template 500 and contains a plurality of nodes and cross references between them.

FIG. 5(*b*) is a block diagram showing a configuration of a first template 515 as a specific example of the template 500. A specific value "1" is set in the template ID 504. The pattern structure information 505 has five nodes 506 to 510 and cross references between them. The cross references between the nodes are indicated by arrows in FIG. 5(*b*). Types of the cross references are described at the arrows according to the following notation: p for parent reference, c for child reference, ns for next sibling reference, and ps for previous sibling reference. The structure information indicated by this pattern structure information 505 has five end points, and four end points among them are allowed as external interfaces. They are described by "o". Conversely, each end point described by "x" is not allowed as an external interface. Namely, the parent reference of node 506, and the child references of node 508, node 509, and node 510 are external interfaces. The connection information 511 describes a list of these external interfaces for the respective nodes and types of cross references.

The match detector 103 imports the structure information 106, and transformation location information 110 indicating a location to be transformed by the transformer 105 (transformation location) in the structure information 106, and detects a portion (match portion) between the structure information 106 and the template stored in the storage 102, excepting the transformation location indicated by the transformation location information 110, from objects of detection (so as to exclude the transformation location from objects of detection). As shown in FIG. 1, the transformation location information 110 is preliminarily provided inside the document transformation system 101. However, the document transformation system 101 may also be configured to import and acquire the transformation location information 110 from the outside. Another potential configuration is such that a transformation location storage (not shown) for storage of the transformation location information 110 is provided and the match detector 103 acquires the transformation location information from the transformation location storage.

Figure 23:
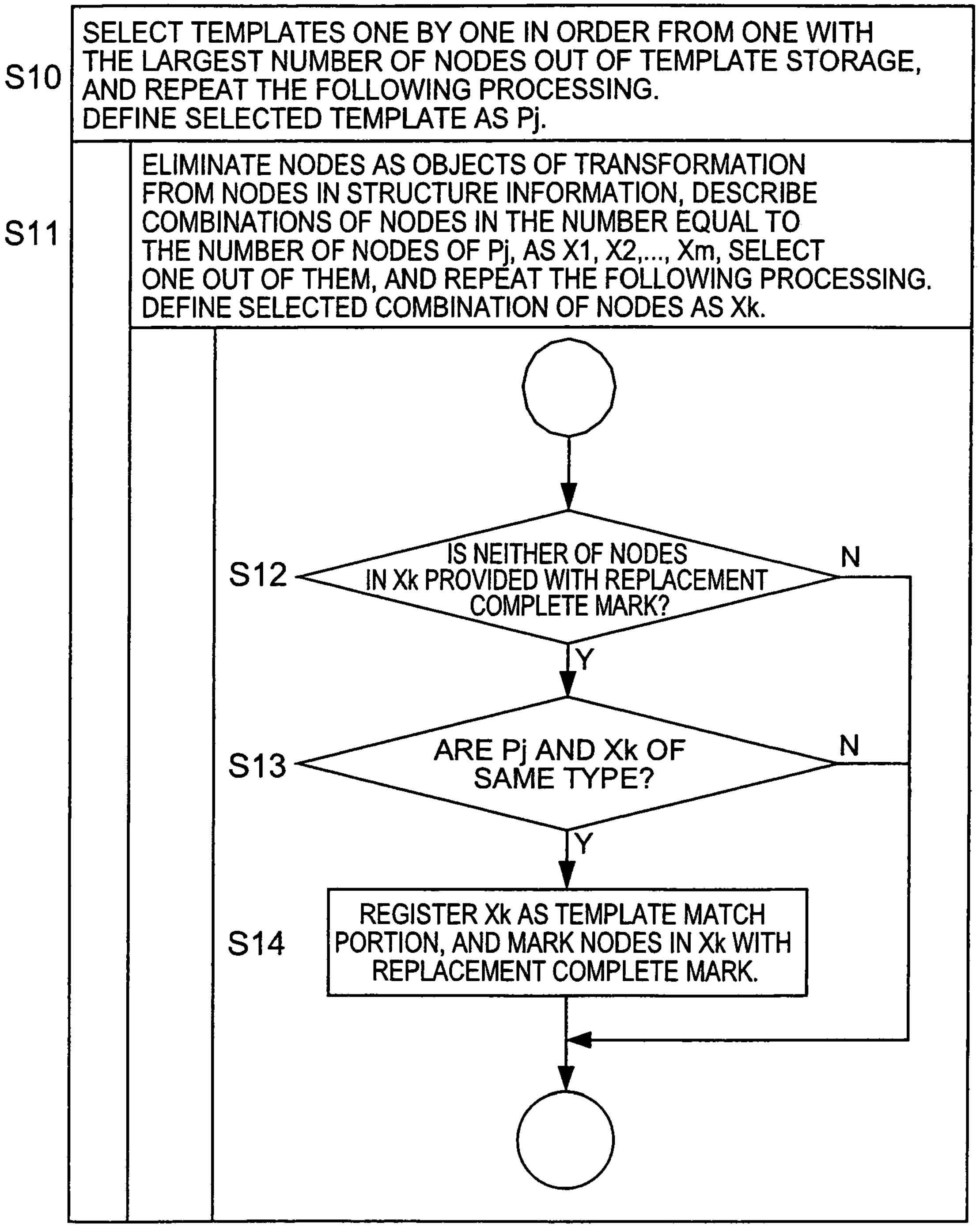
FIG. 23 is a diagram showing an example of a match detection procedure.

Let us suppose herein that, for example, "node 312" in the structure information 12 shown in FIG. 4(*a*) is fed as the transformation location information 110. The match detection procedure in the match detector 103 is carried out, for example, according to the procedure shown in FIG. 23 (which will be described later). As shown in FIG. 23, the match detector 103 detects a match portion in the structure information 12 with the template stored in the storage 102, excepting the "node 312" indicated by the input transformation location information 110, from objects of match detection so as to exclude it from search objects.

Let us also suppose that the storage 102 stores the first template 515 shown in FIG. 5(*b*). Since structure information indicated by nodes 302, 303, 304, 305, and 306 (302-306) in the structure information 12 matches the first template 515, the match detector 103 outputs the nodes 302 to 306 as match information 111 indicating the match portion between the structure information 12 and the first template 515. Similarly, since structure information indicated by nodes 310, 311, 315, 316, and 317 also matches the first template 515, the nodes 310, 311, 315, 316, and 317 are also outputted as match information 111. In contrast, structure information indicated by nodes 308, 309, 312, 313, and 314 also matches the first template 515, but, because the "node 312" is fed as the transformation location information 110, the nodes 308, 309, 312, 313, and 314 are excepted from objects of detection and are not included in the match information 111.

Where a plurality of nodes are fed as the transformation location information 110, the match detector 103 also detects a match portion in the same manner as above. For example, when in FIG. 4(*a*) "node 315" is fed in addition to the node 312 as the transformation location information 110, the match detector 103 detects a match portion excepting the nodes 312, 315 from objects of match detection. For this reason, supposing the template stored in the storage 102 is the first template 515 only, the information outputted as the match information 111 is the nodes 302-306 only. The match detector 103 may also be configured to import an evaluation expression (e.g., the Xpath expression) for evaluating objects of transformation locations in the structure information, using the structure information and character string information. In that case, the match detector 103 imports the character string information 107 and evaluates each object of transformation location in the structure information 12, according to the evaluation expression indicated by the input transformation location information 110.

Figure 6:
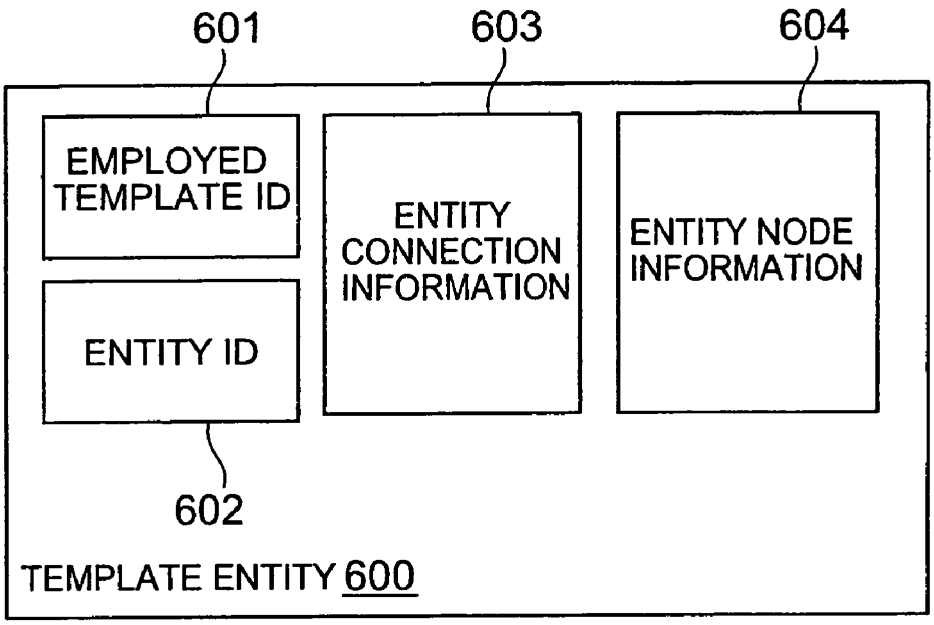
FIG. 6 is a block diagram showing a configuration of a template entity.

The replacer 104 imports the structure information 106 and the match information 111, replaces each match portion indicated by the match information 111, in the structure information 106 with the template, and outputs structure information after the replacement with the template (replaced structure information) 112. FIG. 6 shows a template entity 600 as a call of the template upon the replacement with the template. As shown in FIG. 6, the template entity 600 is called as an object having an employed template ID 601, an entity ID 602, entity connection information 603, and entity node information 604. The employed template ID 601 contains information for designating a template employed upon the replacement, out of those stored in the storage 102.

Since the template 500 can be uniquely specified by the template ID 501, as shown in FIG. 5(*a*), the employed template can be surely designated by the employed template ID 601 shown in FIG. 6. Likewise, the entity ID 602 in FIG. 6 is an ID for uniquely specifying the template entity 600. Similarly, the entity connection information 603 in FIG. 6 contains information to specify connection relations indicating how the template entity 600 is connected to other nodes. As shown in FIG. 5(*a*), the template 500 contains the description of external interfaces in the connection information 502, whereas the entity connection information 603 contains a description to specify with which node each of the external interfaces is connected. When an external interface is connected with a node in another template, an entity ID 602 indicating a template entity thereof, and the node in the template are described in connection. The entity node information 604 specifies with which character string information each of the nodes in the template is connected. As shown in FIG. 5(*a*), the pattern structure information 503 is described in the template 500, and the entity node information 604 describes with which character string information each of the nodes in the pattern structure information 503 is connected. As in the table 13 shown in FIG. 4(*b*), the character string information has the numbers (node numbers, 301 to 323 in FIG. 4(*b*)) assigned to the respective nodes, and the node type information and text information, and can be uniquely specified by the node numbers. Therefore, node numbers are described in the entity node information 604.

Figure 7:
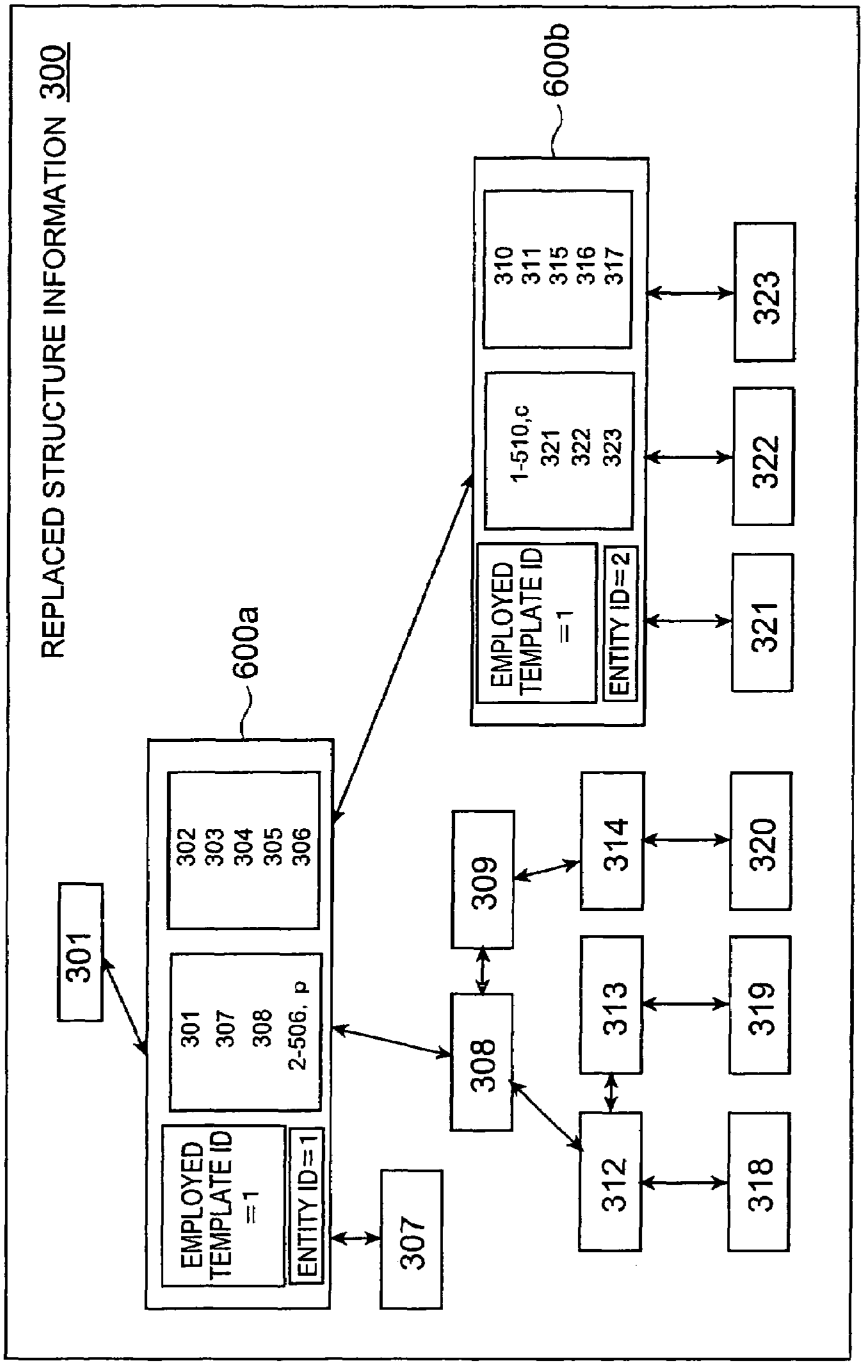
FIG. 7 is a diagram showing replaced structure information.

The result of the replacement by the replacer 104 is presented in FIG. 7. FIG. 7 is a block diagram showing a configuration of replaced structure information 300 after the replacement by the replacer 104. The replaced structure information 300 is a specific example of the replaced structure information 112 outputted from the replacer 104, and has two template entities 600*a*, 600*b*. The template entities 600*a*, 600*b* can be discriminated from each other by their respective entity IDs 602 (entity ID "1" for the former and entity ID "2" for the latter). Since the template entities 600*a*, 600*b* both have the employed template ID of "1", the first template 515 shown in FIG. 5(*b*) is employed. The entity connection information 603 of each of the template entities contains information corresponding to the connection information 511 of the first template 515 from top, in the order shown in FIG. 7. In the present embodiment, (vertex ID, type of cross reference) is presented in order to uniquely identify a reference from each vertex; for example, (508, c) indicates a child reference of vertex 508.

Set in the template entity 600*a* is information indicating that node 301 is connected to (506, p) and node 307 is connected to (508, c). Also set is information indicating that node 308 is connected to (509, c), and 2-506 to (510, c). Here (2-506, p) indicates a parent reference p of node 506 in the template of the template entity 600*b* (entity ID="2"). Set in the template entity 600*b* is information indicating that (1-510, c) is connected to (506, p) in the first template 515, and node 321 to (508, c). Also set is information indicating that node 322 is connected to (509, c), and node 323 to (510, c).

Set in the entity node information 604 is information corresponding in the direction from upper left to lower right to the nodes 506 to 510 in the pattern structure information 505 in the first template 515 from top, in the order shown in FIG. 7. In the template entity 600*a*, the entity node information contains the information indicating that the nodes 302, 303, 304, 305, and 306 correspond to the nodes 506, 507, 508, 509, and 510 (506-510), respectively. In the template entity 600*b*, the entity node information contains the information indicating that the nodes 310, 311, 315, 316, and 317 correspond to the nodes 506-510, respectively. In this manner, the replaced structure information 300 shown in FIG. 7 has the same meaning as the structure information 12 shown in FIG. 4(*a*). Since the template is applied to reuse the structure information, compression is effected in lower data volume than that of the structure information 12.

The match information 111 does not reflect the structure information of the node 308 and subsequent nodes in the structure information 12 (the structure information formed by 308, 309, 312, 313, 314, 318, 319, and 320) because the detection of a match portion by the match detector 103 is carried out excepting the node 312. Therefore, it is not replaced with the template by the replacer 104 and the contents of the structure information 12 are succeeded as they are.

Then the transformer 105 imports the character string information 107, the replaced structure information 112, and a transformation rule 113 for transformation of the character string information 107 and replaced structure information 112, and transforms the character string information 107 and the replaced structure information 112 according to the transformation rule 113. The transformer 105 outputs the replaced structure information after the transformation (hereinafter referred to as "transformed structure information") as first output data 108, and outputs the character string information after the transformation (hereinafter referred to as "transformed character string information") as second output data 109.

The transformation rule 113 is a description of the contents of the processing by the transformer 105, and is comprised of a transformation object location indicating a location of a transformation object, and a transformed, structured document (consisting of structure information and character string information) indicating what structured document is to be obtained after the transformation of the structure information containing a node indicated by the transformation object location. This transformation rule 113 may be fed from the outside of the document transformation system 101 or may be preliminarily designated for the transformer 105.

Figure 12:
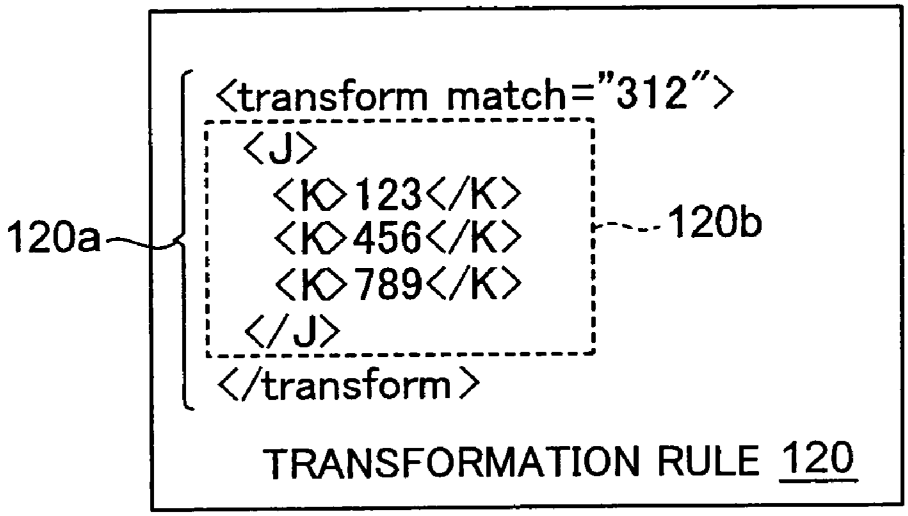
FIG. 12 is a diagram showing an example of a transformation rule.

FIG. 12 is a diagram showing a configuration of a transformation rule 120 as a specific example of the transformation rule 113. The transformation rule 120 shown in FIG. 12 is described by XML, and contains a rule having the meaning that the transformation object location is "312" and that the structure information at and after the node indicated by the transformation object location (node 312) is to be transformed into a structured document 120*a* between <transform match="312 "> and </transform>.

Figure 8:
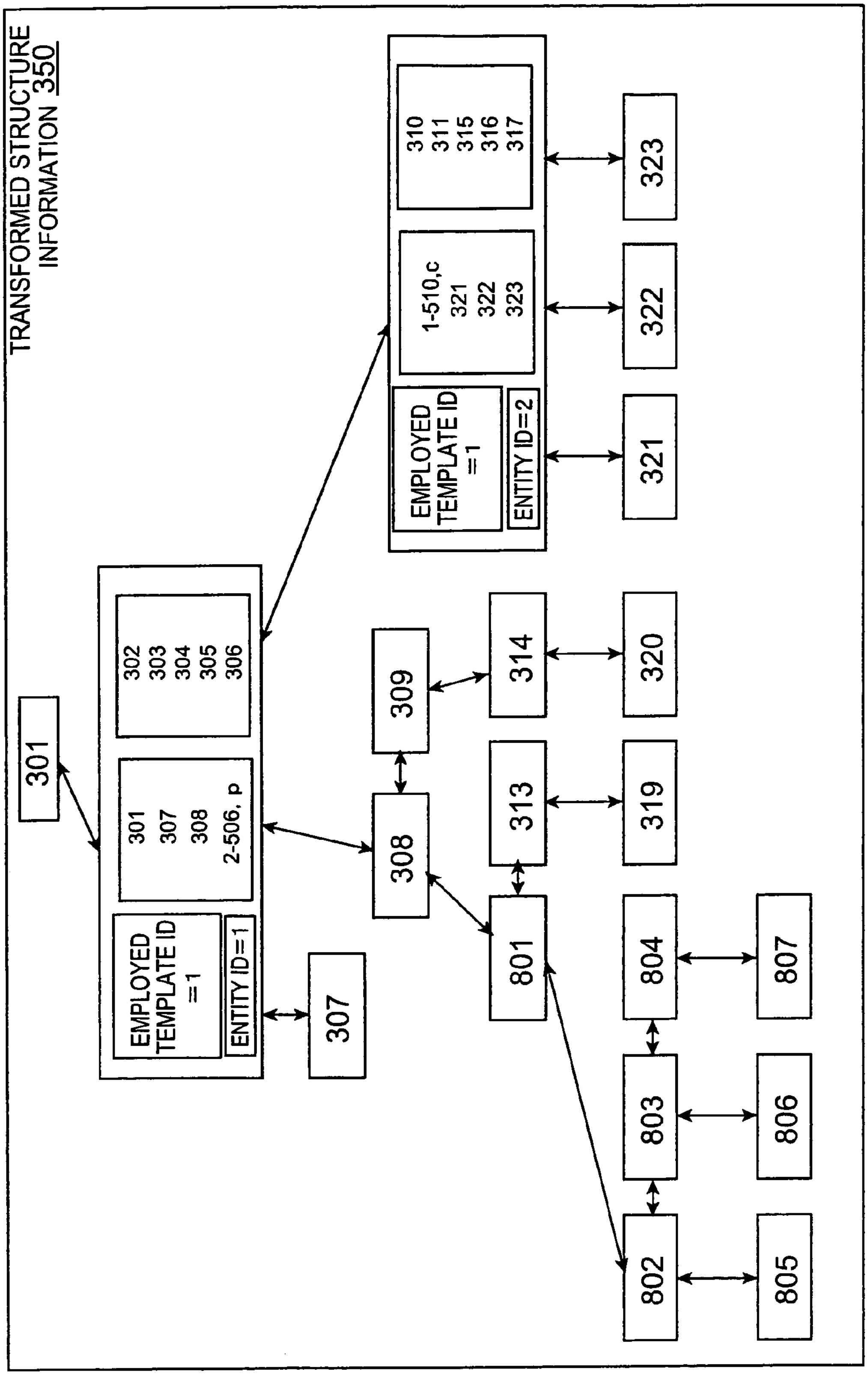
FIG. 8 is a diagram showing transformed structure information.

FIG. 8 shows replaced structure information transformed according to this transformation rule 120 by the transformer 105, i.e., transformed structure information 350, and FIG. 13 shows character string information transformed according to the rule 120 by the transformer 105, i.e., transformed character string information. FIG. 8 is a block diagram showing a configuration of the transformed structure information 350, and FIG. 13 is a diagram showing a table 23 with a list of the transformed character string information. As shown in FIG. 8, the structure information of the node 312 and subsequent nodes (312-318) in the structure information 12 shown in FIG. 4(*a*) is transformed into structure information of node

801 and subsequent nodes (801-807) in the transformed structure information 350. As shown in FIG. 13, the character string information of the nodes 312 and 318 in the structure information 12 is transformed into character string information of nodes 801, 802, 803, 804, 805, 806, and 807 in the transformed structure information 350 (that is to say, the character string information of the nodes 801-807 is set instead of the character string information of the nodes 312, 318). Then the transformed structure information 350, and the character string information constituting the table 23 is outputted as first output data 108 and as second output data 109, respectively.

FIG. 16 shows a transformation rule 121 as another example of the transformation rule 113. FIG. 16 is a diagram showing the transformation rule 121. This transformation rule 121 is described by XSLT (extensible Stylesheet language-transformation), and is comprised of a transformation object location and a transformed, structured document as the transformation rule 120 was. "/A/B/D/F" indicated by element 121*a* represents the transformation object location, and a structured document 121*b* following <J> between <xsl: template match="A/B/D/F"> and </xsl:template> is the transformed, structured document. This example contains the description of the rule meaning that the portion indicated by "/A/B/D/F" is to be transformed into the structured document following <J>. The transformation object location is described by XPath which is the standard technology of the evaluation expression to search for an object by use of the structure information and character string information. In this example, the transformation object location meant by above "/A/B/D/F" indicates "F being a child node of D being a child node of B being a childe node of A being a childe node of the root node "/"". In order to evaluate this XPath expression, therefore, it is necessary to know both what exists as a childe node of a node of interest and what character string information is held by that node. In this case, therefore, the transformer 105 determines the transformation object location by use of the structure information 106 and the character string information 107.

If the replacement with the template were carried out including the transformation location indicated by the transformation location information, to effect compression, the transformer 105 could transform the replaced transformation location into a structured document having different structure information from that before the transformation. Then the structure information after the transformation would be inconsistent with the template used in the replacement and it is thus necessary for the transformer 105 to perform a process of returning the replaced transformation location to the original structure information before the replacement, which lowers the efficiency of the compression and transformation processes. However, when the replacement is carried out excepting the transformation location as in the document transformation system 101 in the present embodiment, the transformation is done without decompression of the structure information replaced with the template, so as to achieve efficient compression and transformation.

Figure 26:
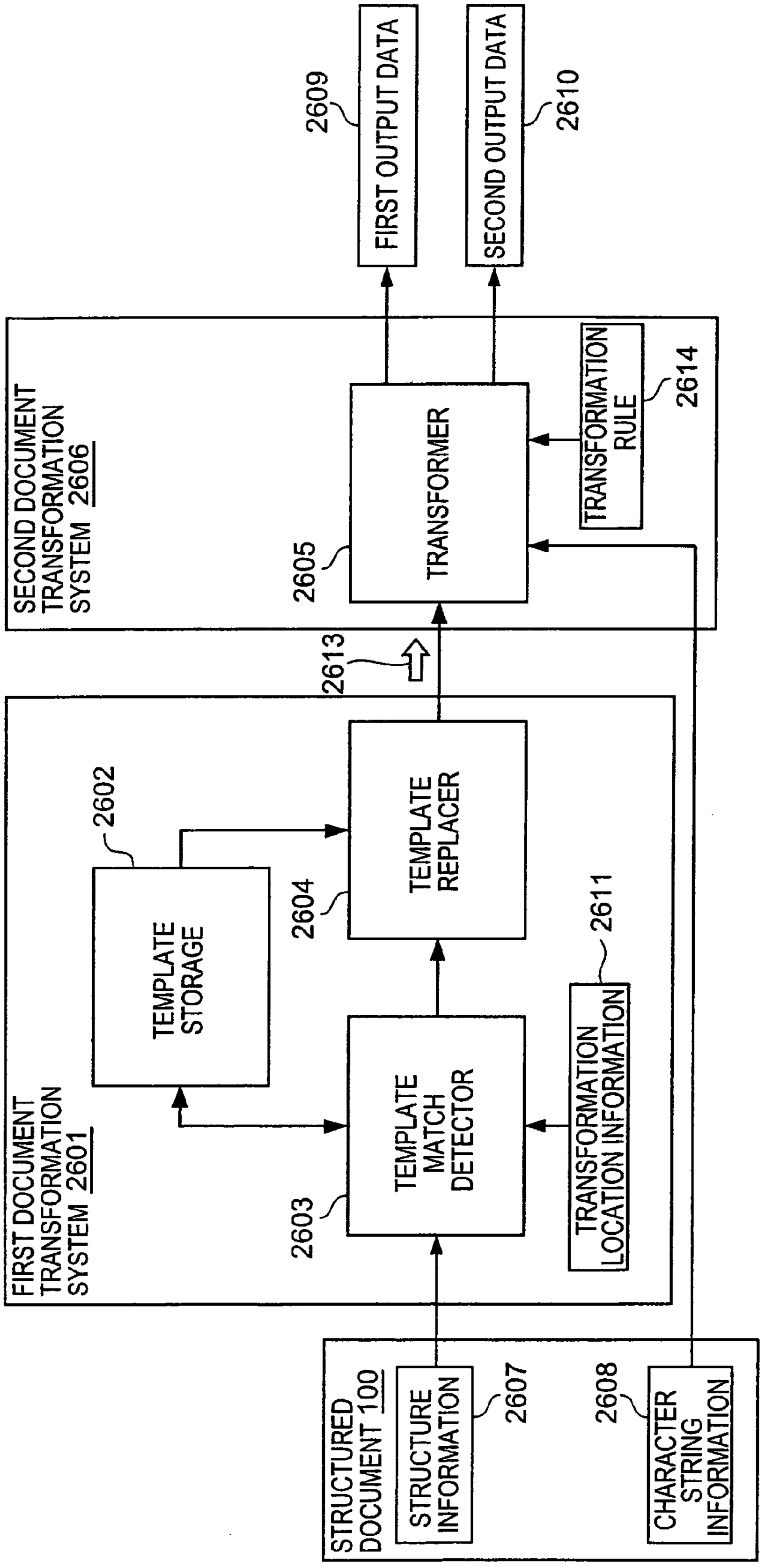
FIG. 26 is a block diagram showing a configuration of a document transformation system comprised of a plurality of systems.

Incidentally, the document transformation system 101 shown in FIG. 1 is constructed as a single system incorporating the components from storage 102 to transformer 105, but the document transformation system according to the present invention does not always have to be implemented as a single system, and can also be implemented by a plurality of systems connected through unrepresented communication means. FIG. 26 is a block diagram showing a configuration of a document transformation system comprised of a plurality of systems. As shown in FIG. 26, the document transformation system is separated into a first document transformation system 2601 comprised of a storage 2602, a match detector 2603, and a replacer 2604, and a second document transformation system 2606 comprised of a transformer 2605. The first document transformation system 2601 imports structure information 2607 forming a structured document 100, and outputs replaced structure information 2613 to transmit (or feed) it to the second document transformation system 2606. The second document transformation system 2606 imports the replaced structure information 2613, character string information 2608 forming the structured document 100, and a transformation rule 2614, outputs transformed structure information as first output data 2609, and outputs transformed character string information as second output data 2610.

Figure 9:
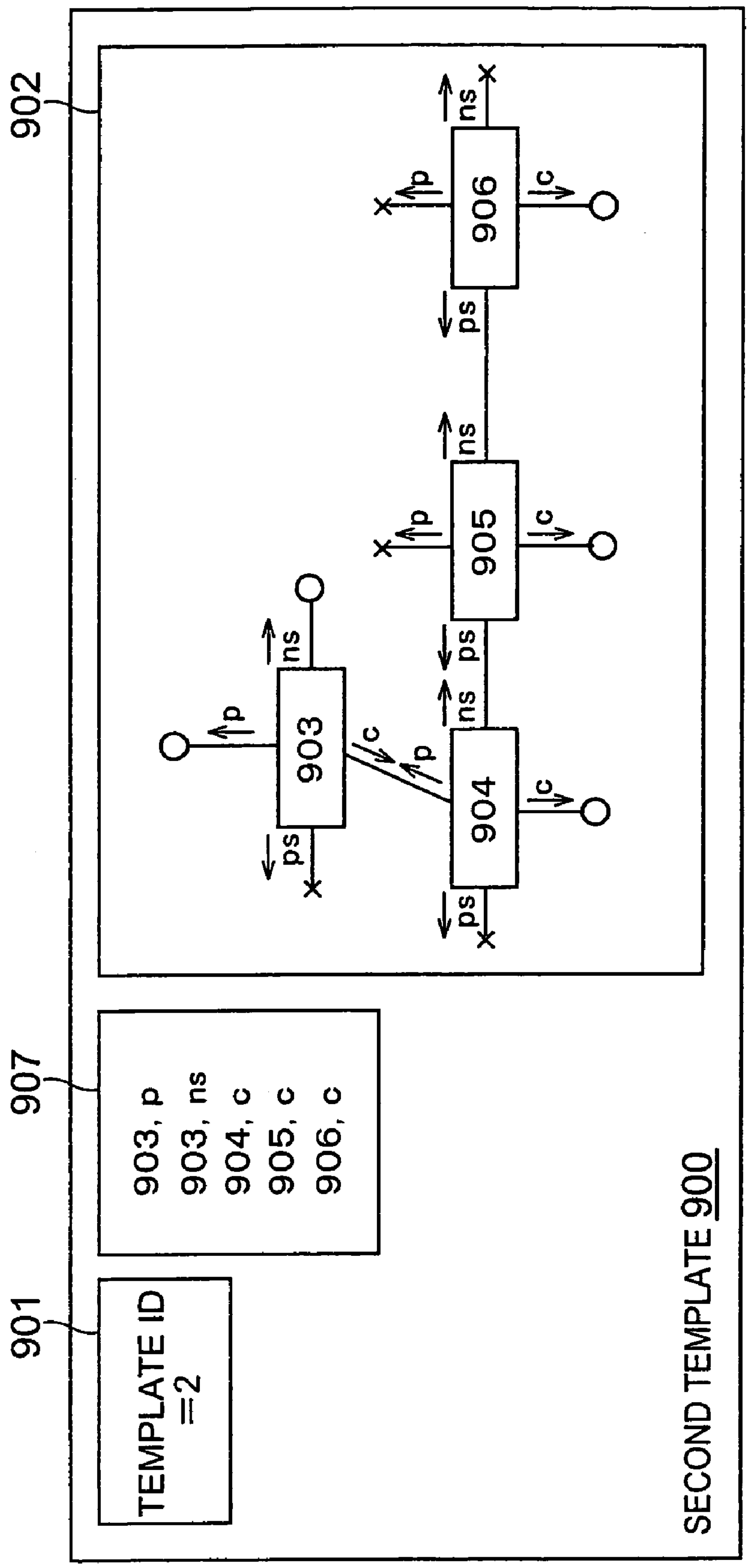
FIG. 9 is a block diagram showing a configuration of a second template.

On the other hand, the document transformation system 101 is able to replace the first output data 108 in FIG. 1 with a template stored in the storage 102. Let us suppose herein that the storage 102 stores a second template 900 shown in FIG. 9. FIG. 9 is a block diagram showing a configuration of the second template 900. The second template 900 shown in FIG. 9 has a template ID 901, connection information 907, and pattern structure information 902. The template ID 901 contains "2", and the connection information 907 contains (903, p), (903, ns), (904, c), (905, c), and (906, c). The pattern structure information 902 contains structure information indicating connections of nodes 903, 904, 905, and 906.

Figure 10:
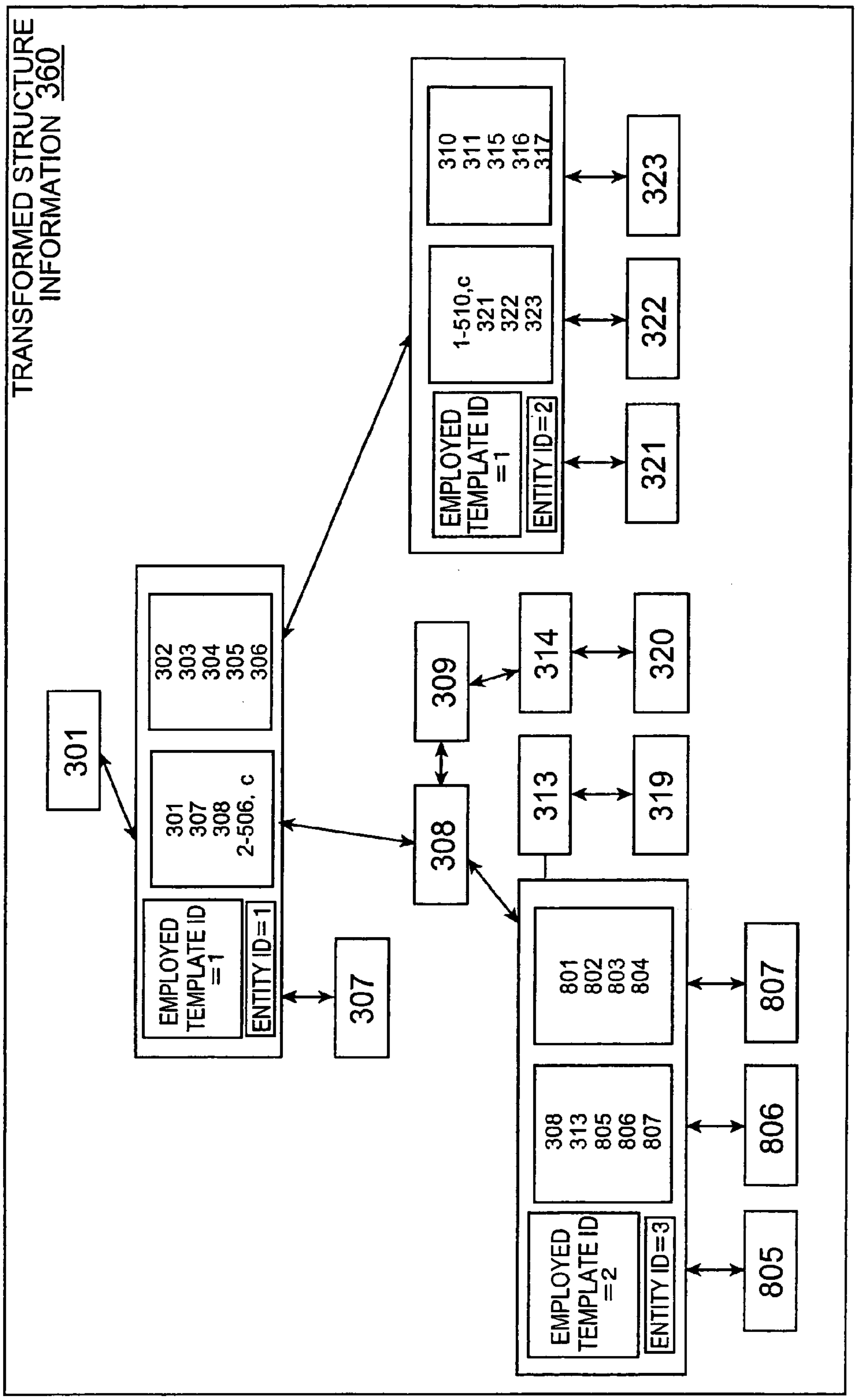
FIG. 10 is a diagram showing another transformed structure information.

In the document transformation system 101, the transformed structure information 350 (cf. FIG. 8) is fed to the match detector 103, and the match detector 103 detects that the nodes 801 to 804 forming the transformed structure information 350 match the second template 900, and outputs match information 111 indicating the detection result. The replacer 104 replaces the nodes 801-804 indicated by the match information 111, with the second template 900. FIG. 10 is a block diagram showing a configuration of transformed structure information 360 after the replacement. As shown in FIG. 10, the second template 900 is adopted for the nodes 801 to 804. By again applying the template to the transformed structure information in this manner, the compression can be done while further reducing the data volume.

Figure 24:
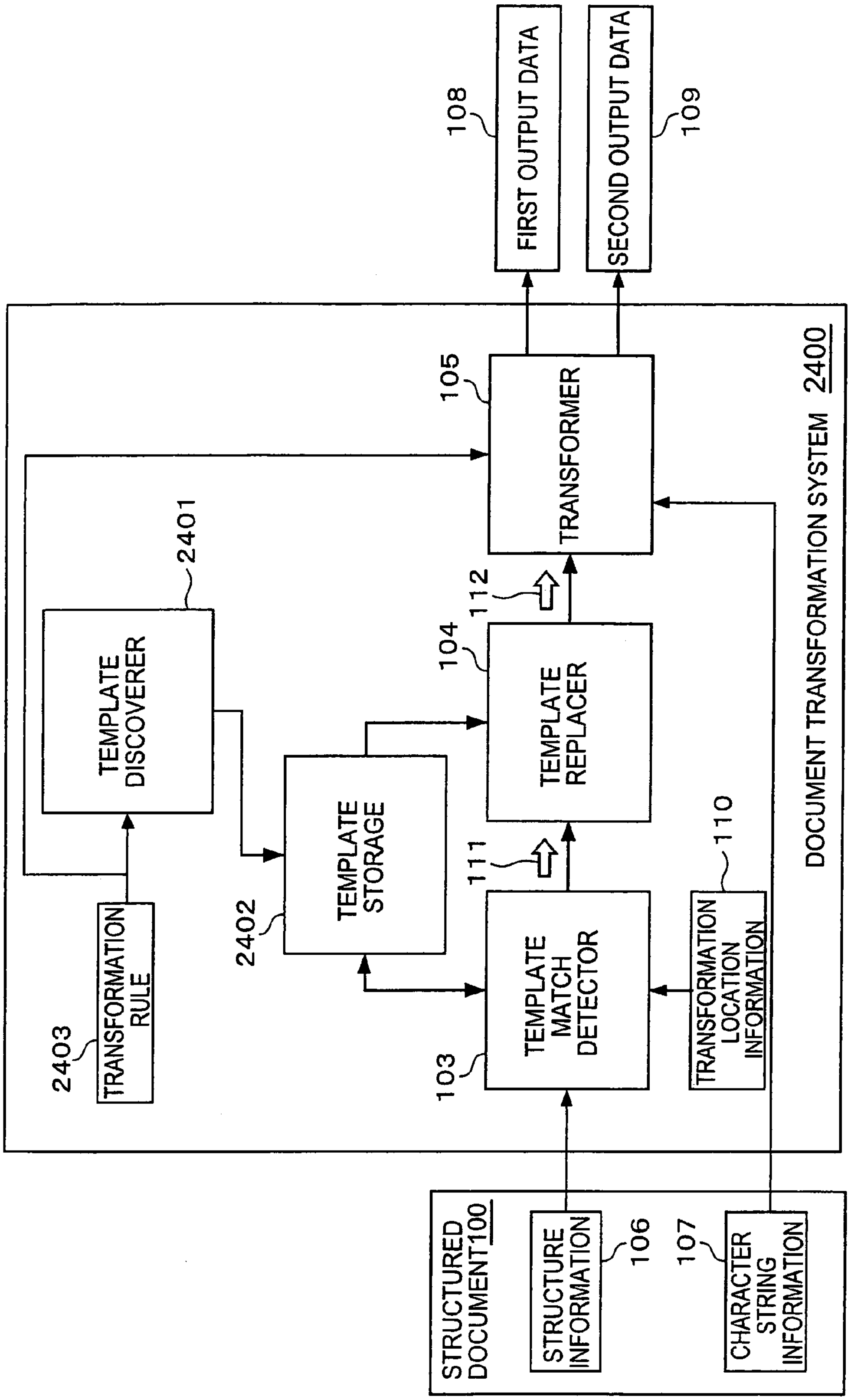
FIG. 24 is a block diagram showing a configuration of a document transformation system with a discovering device.

The document transformation system 101 can also be constructed, as shown in FIG. 24, as a document transformation system 2400 provided with a template discovering device (hereinafter referred to as a "discoverer") 2401. This document transformation system 2400 has a storage 2402 similar to the storage 102, and the discoverer 2401, in addition to the match detector 103, replacer 104, and transformer 105. In the document transformation system 2400, the discoverer 2401 extracts the structure information of the transformed, structured document (structure information 120*b* in the case of FIG. 12) from a transformation rule 2403 containing a transformed, structured document, and stores it as a template into the storage 2402. This permits the document transformation system 2400 to make the discoverer 2401 discover a template at every input of transformation rule 2403 and add the new template into the storage 2402, thus updating the storage 2402.

Furthermore, the document transformation system 101 may also be constructed as follows: on the occasion of storing a template into the storage 2402, a timestamp (date and time of update) upon the storage is attached to the template to be stored, and at every use of the template by the replacer 104, the timestamp is updated to a timestamp upon transformation. This permits the document transformation system 101 to dynamically manage the storage 2402 by the LRU (Least Recently Used) algorithm or the like, which can reduce the capacity of a memory cache necessary for the storage 2402.

Figure 25:
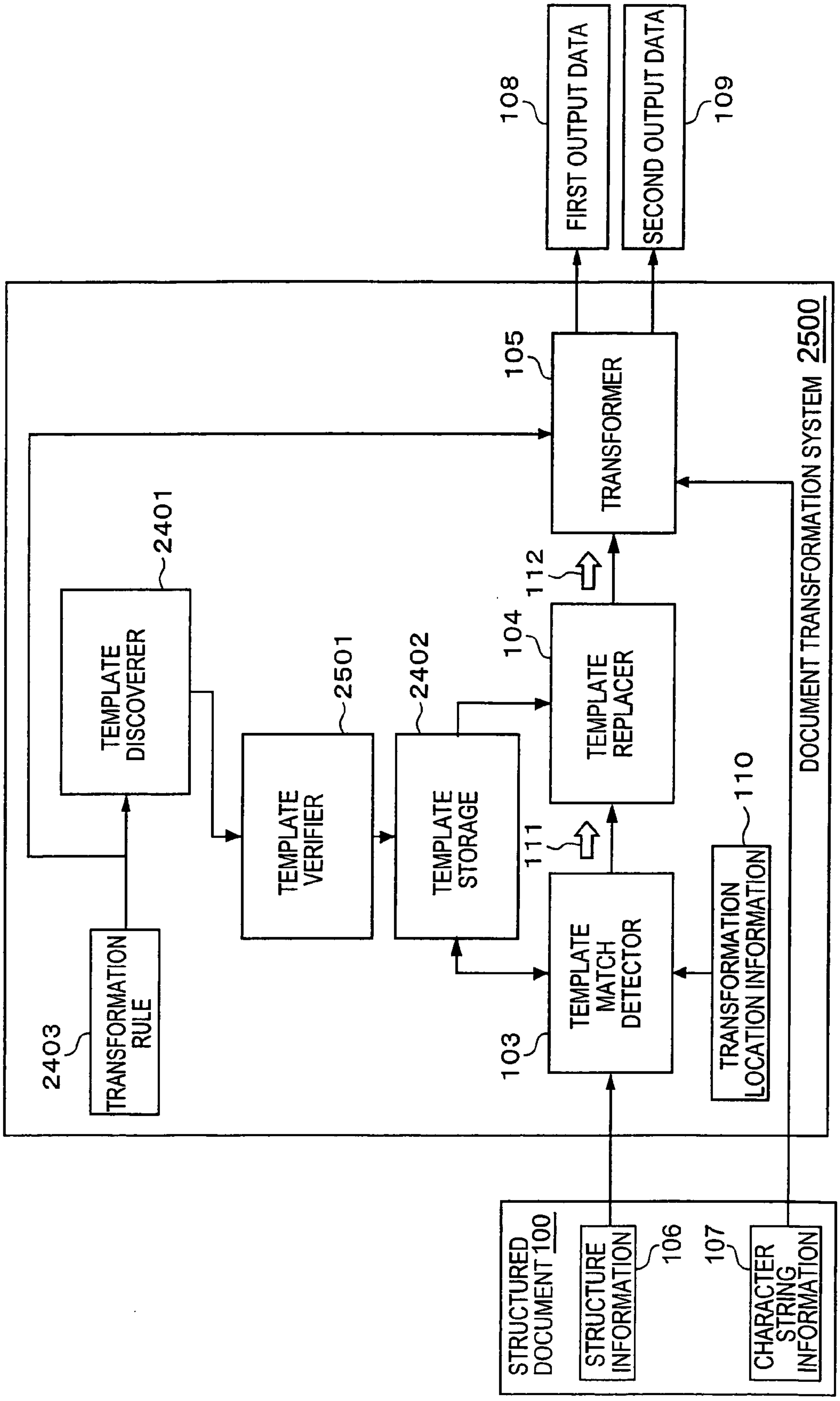
FIG. 25 is a block diagram showing a configuration of a document transformation system with a verifying device

Furthermore, the document transformation system may also be provided with a template verifying device (hereinafter referred to as "verifier") 2501, like a document transformation system 2500 shown in FIG. 25. This document transformation system 2500 is different in the provision of the verifier 2501 from the document transformation system 2400. The verifier 2501 determines whether a template discovered by the discoverer 2401 is to be stored into the storage 2402 (i.e., whether it is necessary to store the template).

This document transformation system 2500 is configured to store a template discovered by the discoverer 2401, into the storage 2503 in accordance with a determination made by the verifier 2501. For example, when a template discovered by the discoverer 2401 is one of the same type as a template stored in the storage 2503 (i.e., when the storage 2503 stores a template of the same type as the discovered template), the verifier 2501 determines that the discovered template is inappropriate as a storage object template, and operates to exclude it from objects of storage. This prevents a redundant template from being stored into the storage 2503, and increases the space utilization efficiency of the storage 2503.

Figure 19:
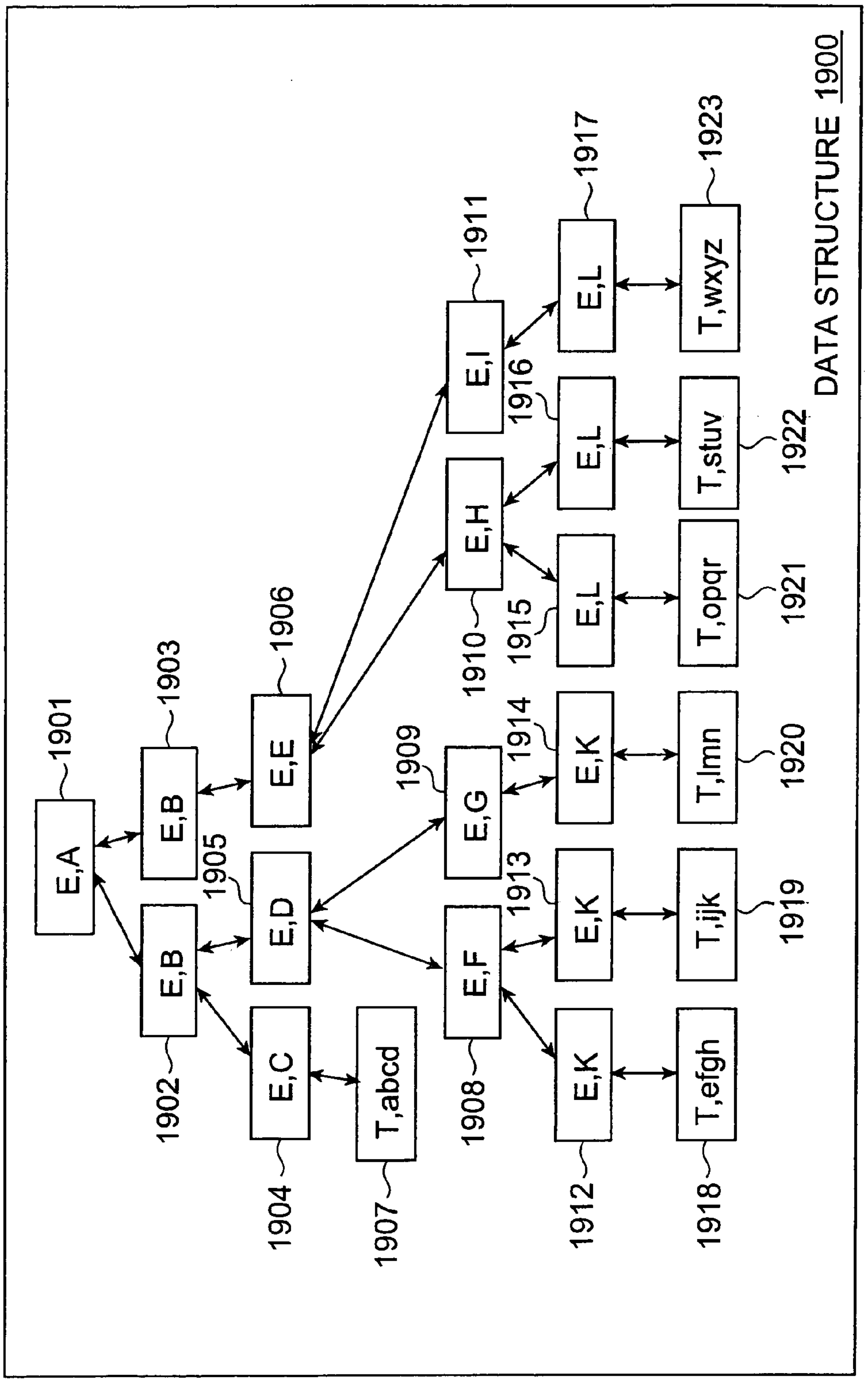
FIG. 19 is a diagram showing an example of data structure different from that of XML documents.

It is noted that the present invention is not intended for only the data structure 11 illustrated in FIG. 3. The input object can be any structured document from which the structure information can be derived, by the same parsing method as the pattern structure information set in the templates: for example, FIG. 19 shows an example of expression of a standard model (Document Object Model) indicating an XML structure. FIG. 19 is a diagram showing data structure 1900 (reference should be made as to the details of Document Object Model to "http://www.w3.org/DOM/").

Second Embodiment

Figure 11:
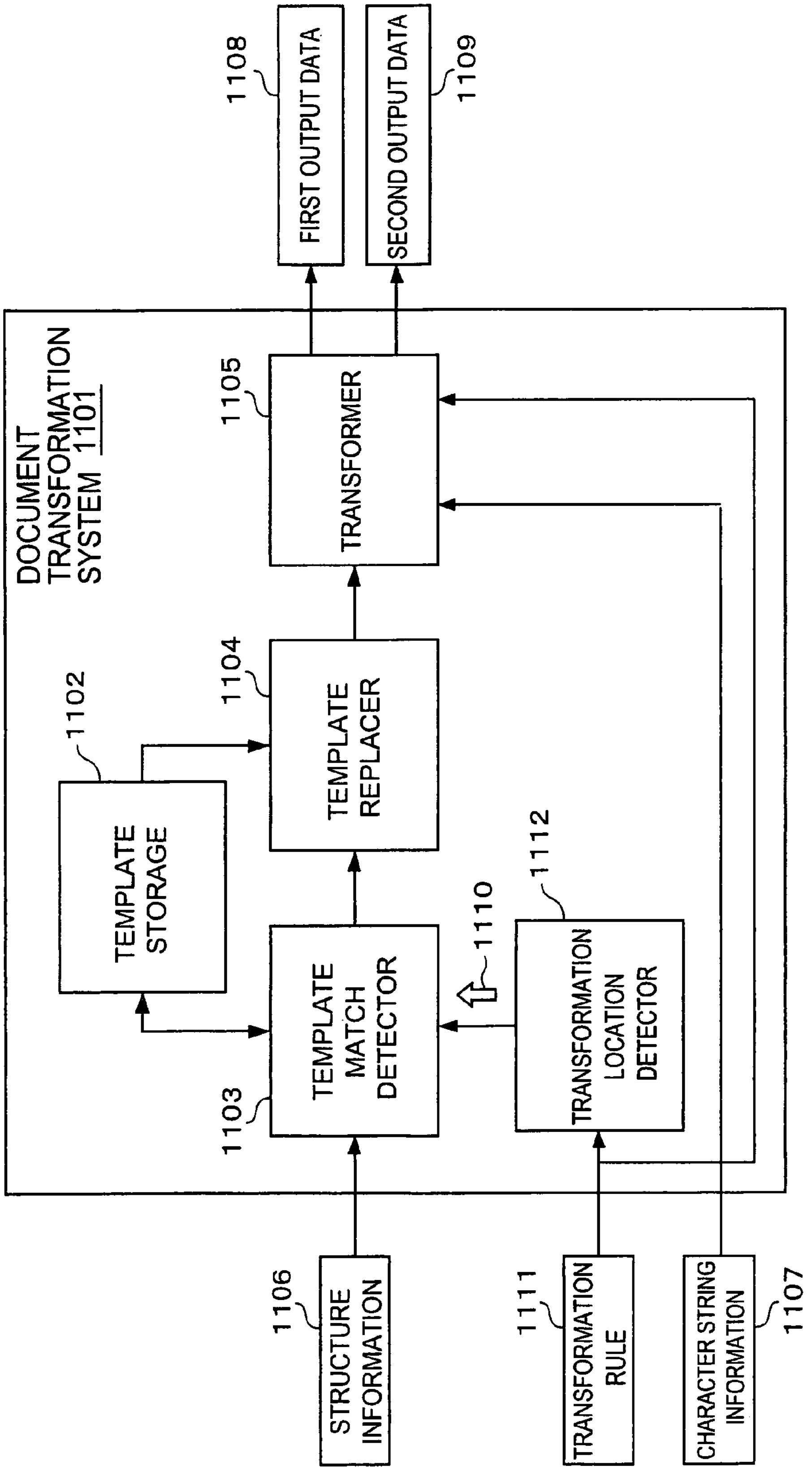
FIG. 11 is a block diagram showing a configuration of a document transformation system according to the second embodiment of the present invention.

FIG. 11 is a block diagram showing a configuration of a document transformation system 1101 according to the second embodiment. As shown in FIG. 11, the document transformation system 1101 has a storage 1102, a match detector 1103, a replacer 1104, a transformer 1105, and a transformation location detector 1112. This document transformation system 1101 imports structure information 1106, character string information 1107, and a transformation rule 1111, and outputs first output data 1108 and second output data 1109. The storage 1102, match detector 1103, replacer 1104, and transformer 1105 have the same structure as the storage 102, match detector 103, replacer 104, and transformer 105, respectively, of the document transformation system 101 according to the first embodiment.

The transformation location detector 1112 imports the transformation rule 1111 and detects a number indicating a transformation object location (transformation location identifier) included in the transformation rule 1111, as transformation location information 1110. For example, supposing the transformation location detector 1112 imports the transformation rule 120, for example, shown in FIG. 12, as the transformation rule 1111, it detects the transformation location identifier of "312 " as the transformation location information 1110 from <transform match="312 ">. The detected transformation location information 1110 is transmitted (or fed) to the match detector 1103 and the operation thereafter is carried out in the same manner as in the document transformation system 101 in the first embodiment, to accomplish the replacement with the template and the transformation for objects of the structure information 1106 and the character string information 1107. The transformation rule 1111 is fed to the transformation location detector 1112 and also to the transformer 1105.

The transformation rule 1111 is sometimes described without the node number by a language necessitating a search for a transformation object location with reference to the structure information and character string information (e.g., XSLT: extensible style-sheet language-transformation or the like), like the transformation rule 121 shown in FIG. 16. In that case, though not shown, the transformation location detector 112 can be configured to import the structure information 1106 and character string information 1107, in addition to the transformation rule 1111, and to detect the transformation location information by evaluating an XPath expression described in the part "xxx" in <xsl:template match="xxx"> designated by element 121*a*, in the structure information 1106 and character string information 1107. The transformation location information may be described by a node number in the structure information 1106 so as to be used in the match detector 1103. In another potential configuration, the transformation location detector 1112 outputs the XPath expression described in the part of "xxx" as the transformation location information, the match detector 1103 further imports the character string information 1107, and the match detector 1103 evaluates the input XPath expression to specify the transformation object location.

Figure 14:
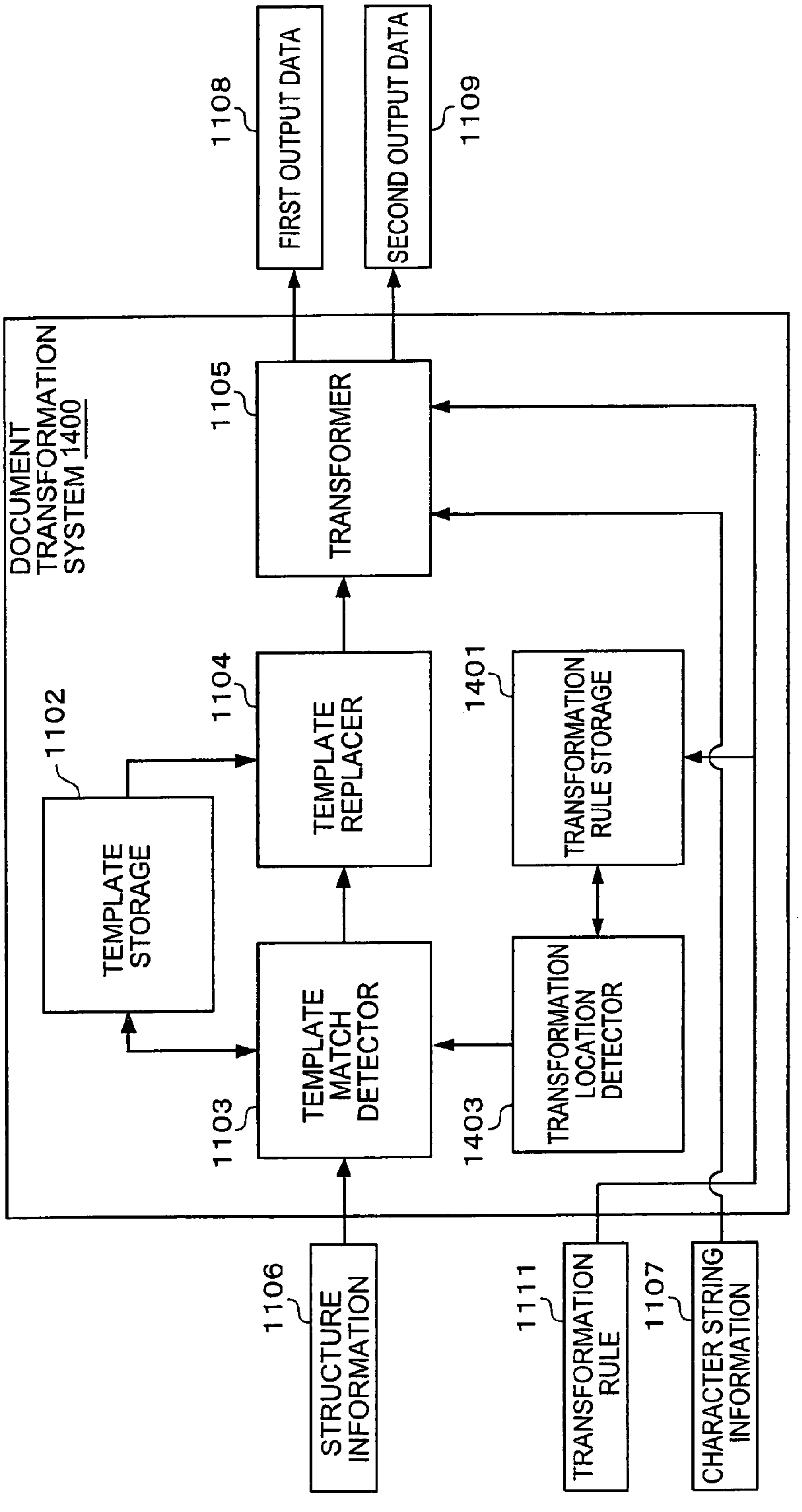
FIG. 14 is a block diagram showing a configuration of a document transformation system obtained by providing the document transformation system of FIG. 11 with a transformation rule storage.

FIG. 14 is a block diagram showing a configuration of a document transformation system 1400 constructed by further providing the document transformation system 1101 shown in FIG. 11, with a transformation rule storage 1401. The document transformation system 1400 is the same as the document transformation system 1101, except that the document transformation system 1400 has the transformation rule storage 1401, and a transformation location detector 1403 different in input information from the transformation location detector 1112.

The transformation rule storage 1401 stores a transformation location identifier included in a transformation rule 1111, every time the transformer 1105 uses the transformation rule 1111. FIG. 15 is a diagram showing a table 150 storing transformation location identifiers. The table 150 has a transformation location column 151 and a use count column 152 and stores transformation location identifiers.

When the transformation rule storage 1401 stores a transformation location identifier, it extracts a transformation location identifier from a transformation rule 1111 used by the transformer 1105, stores it into the transformation location column 151, and stores a use count of the transformation location identifier into the use count column 152. The table 150 indicates that the nodes 305, 312, and 315 were used three times, eleven times, and once, respectively, by the transformer 1105.

Then the transformation location detector 1403 extracts a transformation location identifier from those stored in the transformation rule storage 1401, according to their frequencies of use, i.e., a transformation location identifier with a high frequency of use statistically likely to be used, and transmits (or feeds) it as the transformation location information to the match detector 1103. For example, in the case where the transformation location identifiers are stored as in the table 150, the transformation location identifier with the high frequency of use can be, for example, one with a use count over a certain threshold. When the threshold is "10", only "312 " is extracted as the transformation location identifier in view of the values in the use count column 152, and the "312" is fed as the transformation location information to the match detector 1103.

The processing thereafter can be carried out in the same manner as in the first embodiment. Namely, the match detector 1103 detects a match portion with a template stored in the storage 1102, based on the structure information 1106. In accordance with match information indicating the match portion, the replacer 1104 replaces the structure information 1106 with the template and outputs replaced structure information. Then the transformer 1105 transforms the replaced structure information and the character string information according to the transformation rule, outputs the transformed structure information as first output data 1108, and outputs the transformed character string information as second output data 1109.

According to the document transformation systems 1101, 1400 in the present embodiment, the transformation location information can be fed to the match detector 1103 before the transformation rule is fed into the transformer 1105, and thus it becomes feasible to generate and preserve the replaced structure information in advance. Accordingly, for example, when a structured document identical to a previously transformed, structured document is newly transformed, the replaced structure information previously generated can be used, so as to skip (omit) the processes of the match detection and the replacement with the template at the match detector 1103 and at the replacer 1104. For this reason, the total processing time of the document transformation systems 1101, 1400 can be reduced.

Third Embodiment

Figure 17:
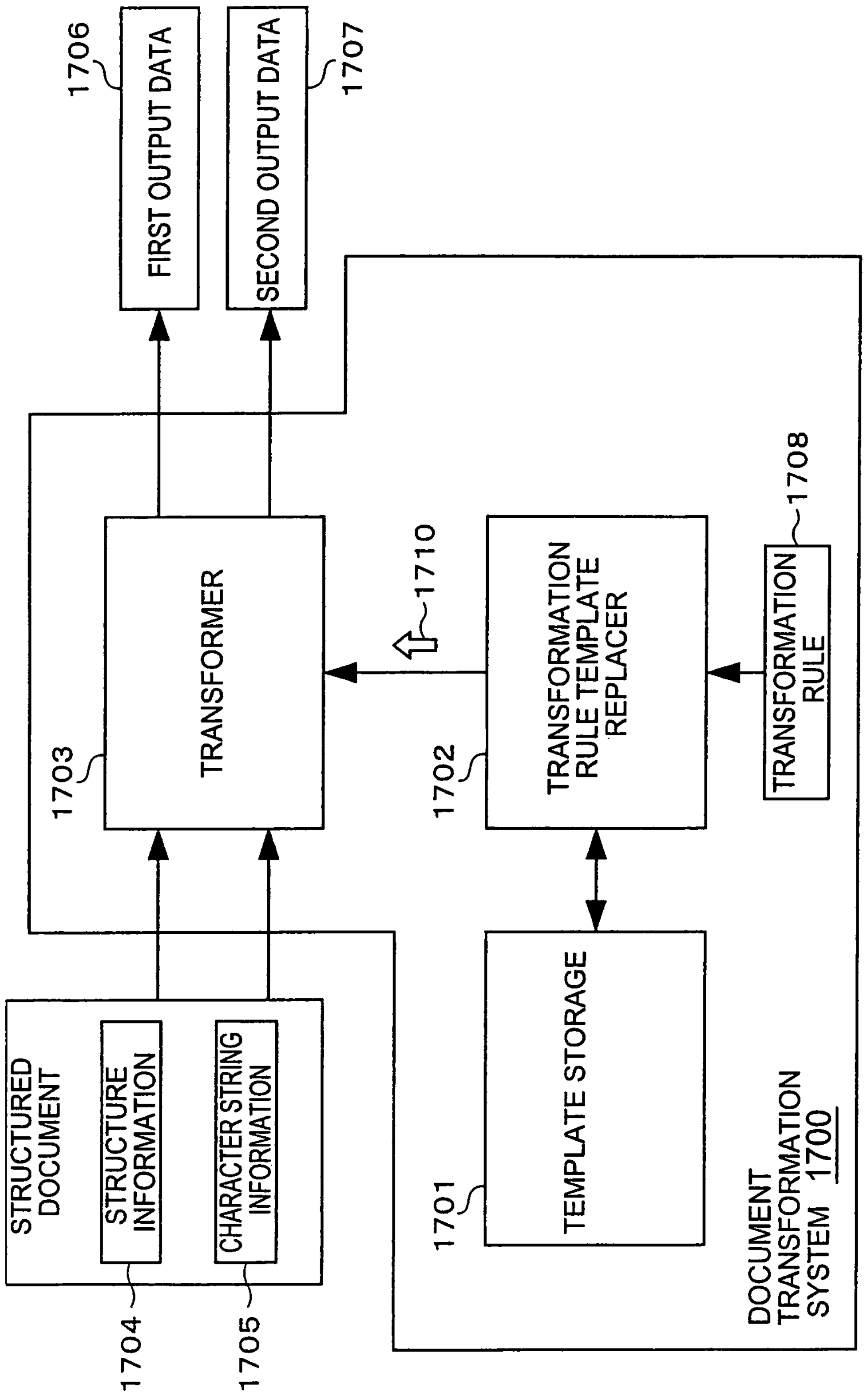
FIG. 17 is a block diagram showing a configuration of a document transformation system according to the third embodiment of the present invention.

FIG. 17 is a block diagram showing a configuration of a document transformation system 1700 according to the third embodiment of the present invention. The document transformation system 1700 has a template storage (hereinafter referred to as "storage") 1701, a transformation rule template replacer (hereinafter referred to as "transformation rule replacer") 1702, and a transformer 1703. The document transformation system 1700 imports structure information 1704 and character string information 1705 of a structured document as an object of transformation, and a transformation rule 1708 containing a description of structure information of a transformed, structured document, outputs transformed structure information as first output data 1706, and outputs transformed character string information as second output data 1707.

The storage 1701, similar to the storage 102 described in the first embodiment (cf. FIG. 1), stores a specific pattern preliminarily defined for structure information in structured documents, as a template. The transformation rule replacer 1702 imports a transformation rule 1708 containing a transformed, structured document such as an XSLT style sheet, and extracts the structure information of the transformed, structured document from the transformation rule 1708. The transformation rule replacer 1702 detects a template matching the extracted structure information, from the storage 1701, replaces the structure information with the detected template, and transmits (or feeds) it as a replaced transformation rule 1710 to the transformer 1703.

Figure 20:
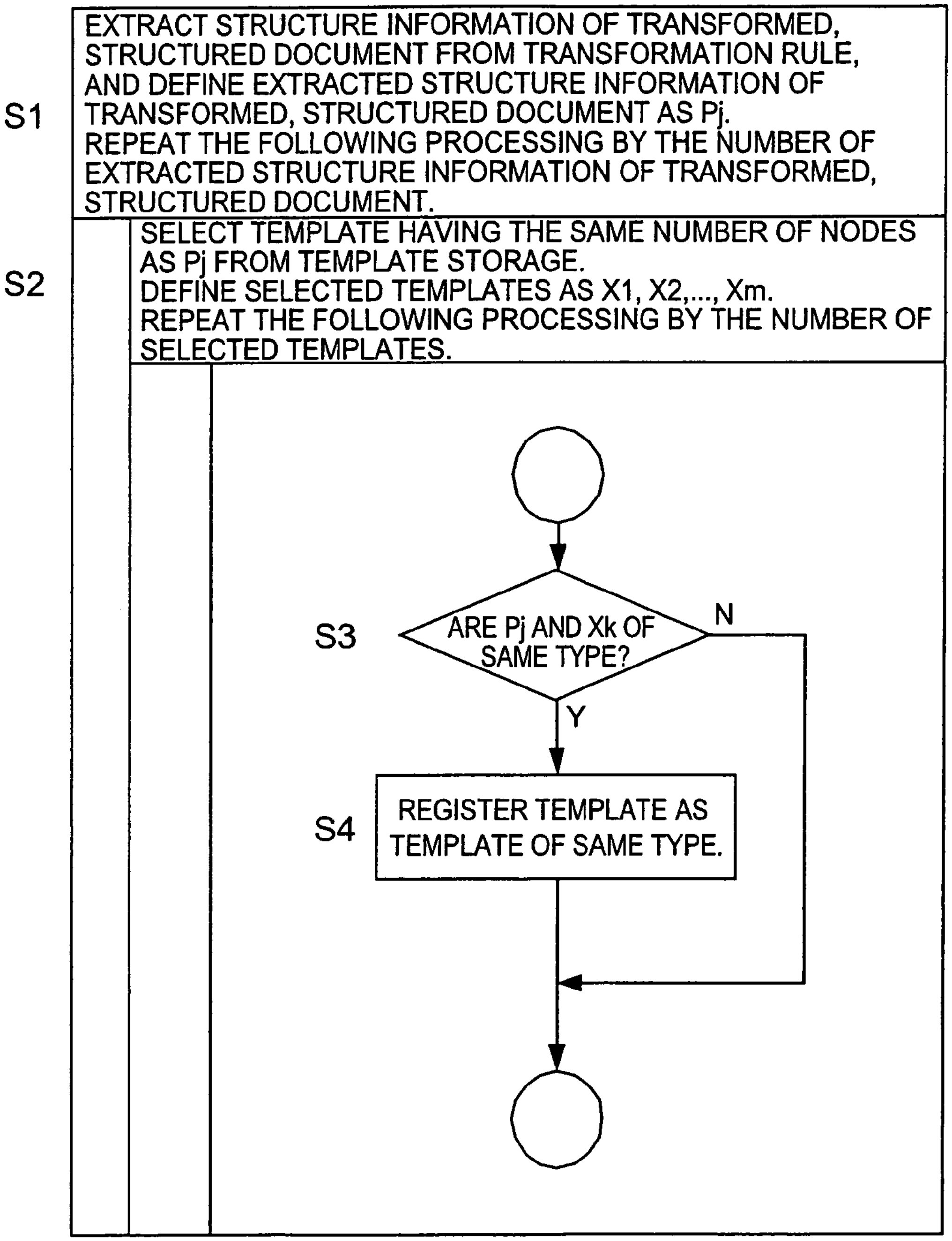
FIG. 20 is a diagram showing a template discovery procedure.

Supposing the transformation rule 120 shown in FIG. 12 is an example of the transformation rule 1708, the transformed, structured document is the structured document 120*a* in the part defined by <transform match="312 "> and </transform>. FIG. 20 shows an example of a search procedure of searching the storage 1701 for a template having the same pattern as the structure information 120*b* of the transformed, structured document. FIG. 20 is a diagram showing the template search procedure. The template detected by this template search procedure is like the second template 900 shown in FIG. 9.

The template search procedure is carried out as shown in FIG. 20: at step 1 after a start of the processing, the structure information of the transformed, structured document is extracted from the transformation rule 1708. The transformed, structured document thus extracted is denoted by Pj. The following processing is repeated by the number of extracted structure information items of the transformed, structured document.

At step 2, templates having the same number of nodes as Pj are selected from the storage 1701. The selected templates are denoted by X1, X2, . . . , Xm. The following processing is repeated by the number of selected templates. At step 3, it is determined whether Pj and Xk are of the same type. When they are of the same type, the flow goes to step 4; otherwise the processing is terminated without execution of step 4. At step 4 the template is registered as a template of the same type, and the processing is terminated.

Figure 21:
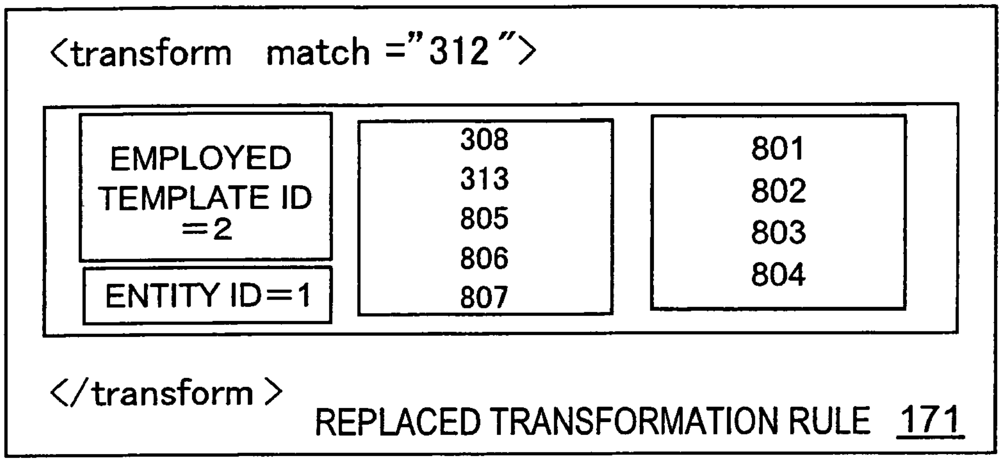
FIG. 21 is a diagram showing another replaced transformation rule.

FIG. 21 is a diagram showing a replaced transformation rule 171 as an example of the replaced transformation rule 1710. The replaced transformation rule 171 shown in FIG. 21 shows a case where the second template 900 shown in FIG. 9 is applied to the transformation rule 120 shown in FIG. 12. In the replaced transformation rule 171, as illustrated, the structure information 120*b* between <transform match="312 "> and </transform> described in the transformation rule 120 is replaced with the template having the employed template ID of "2"(i.e., the second template 900).

Figure 22:
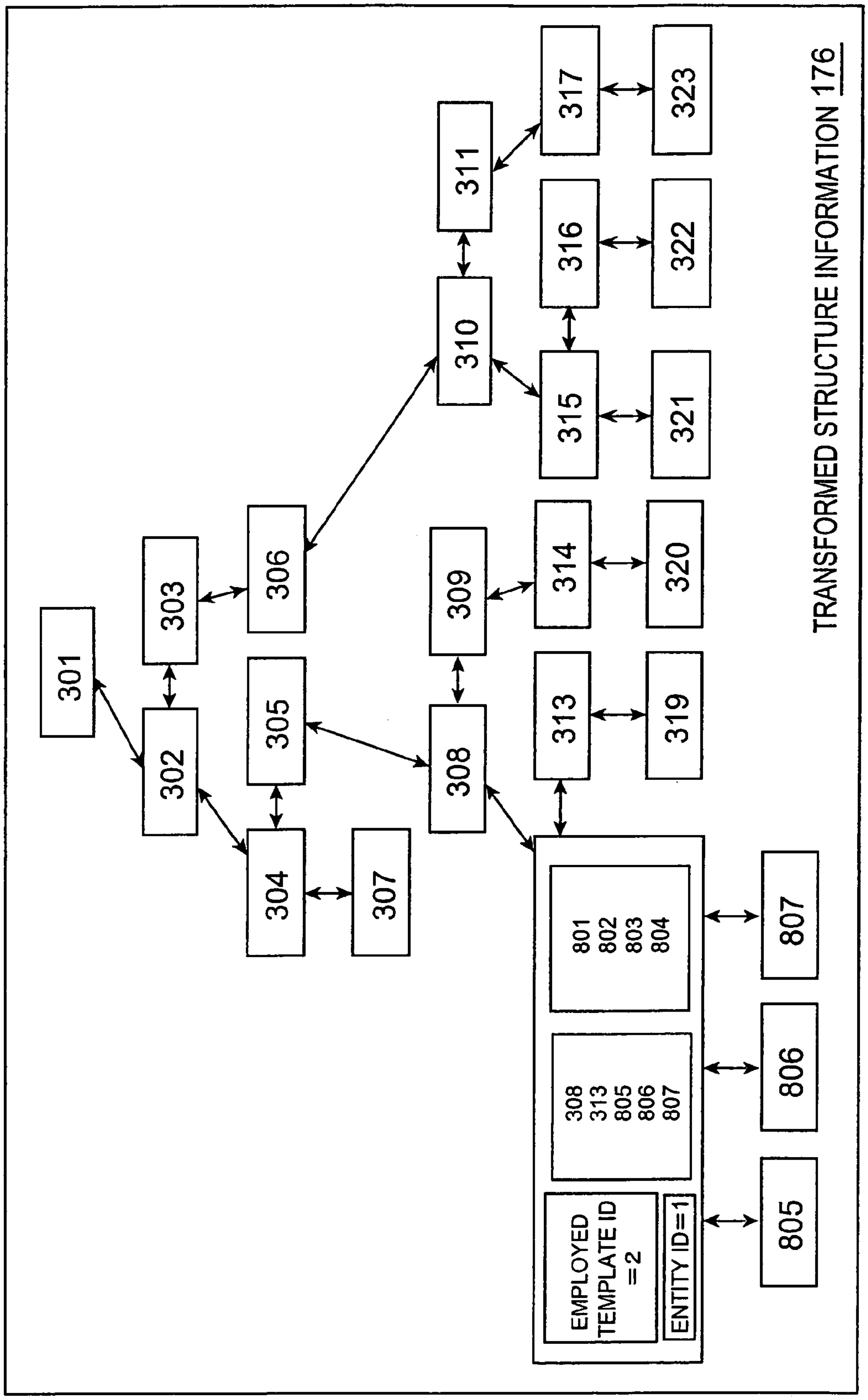
FIG. 22 is a diagram showing another transformed structure information.

The transformer 1703 imports the structure information 1704, the character string information 1705, and the replaced transformation rule 1710, transforms the structure information 1704 and the character string information 1705 according to the replaced transformation rule 1710, outputs transformed structure information as first output data 1706, and outputs transformed character string information as second output data 1707. The transformer 1703 uses the transformation location information ("312 " in the example of FIG. 21) included in the replaced transformation rule 1710, on the occasion of the transformation, to put the structure information of the transformed, structured document into the structure information 1704. FIG. 22 is a diagram showing transformed structure information 176, which is an example of the first output data 1706, as a result of the transformation. The character string information as an example of the second output data 1707 is listed in the table 23 shown in FIG. 13. These are an example of the first output data 1706 and the second output data 1707 with input of the structure information 12 shown in FIG. 4(*a*), the table 13 with the list of character string information described in FIG. 4(*b*), and the replaced transformation rule 171 shown in FIG. 21. As seen from the replaced structure information 176 shown in FIG. 22, the first output data 1706 is one in which the node 312 and subsequent nodes in the structure information are replaced with the template.

Since in the replaced transformation rule 1710 the structure information of the transformed, structured document is already replaced with the template, the transformation with the replaced transformation rule 1710 by the transformer 1703 results in automatically applying the template to effect replacement. Namely, compression is effected with the transformation of the document, so that the compression and transformation are simultaneously carried out. This permits the document transformation system 1700 to perform the transformation and compression processes more efficiently.

Figure 27:
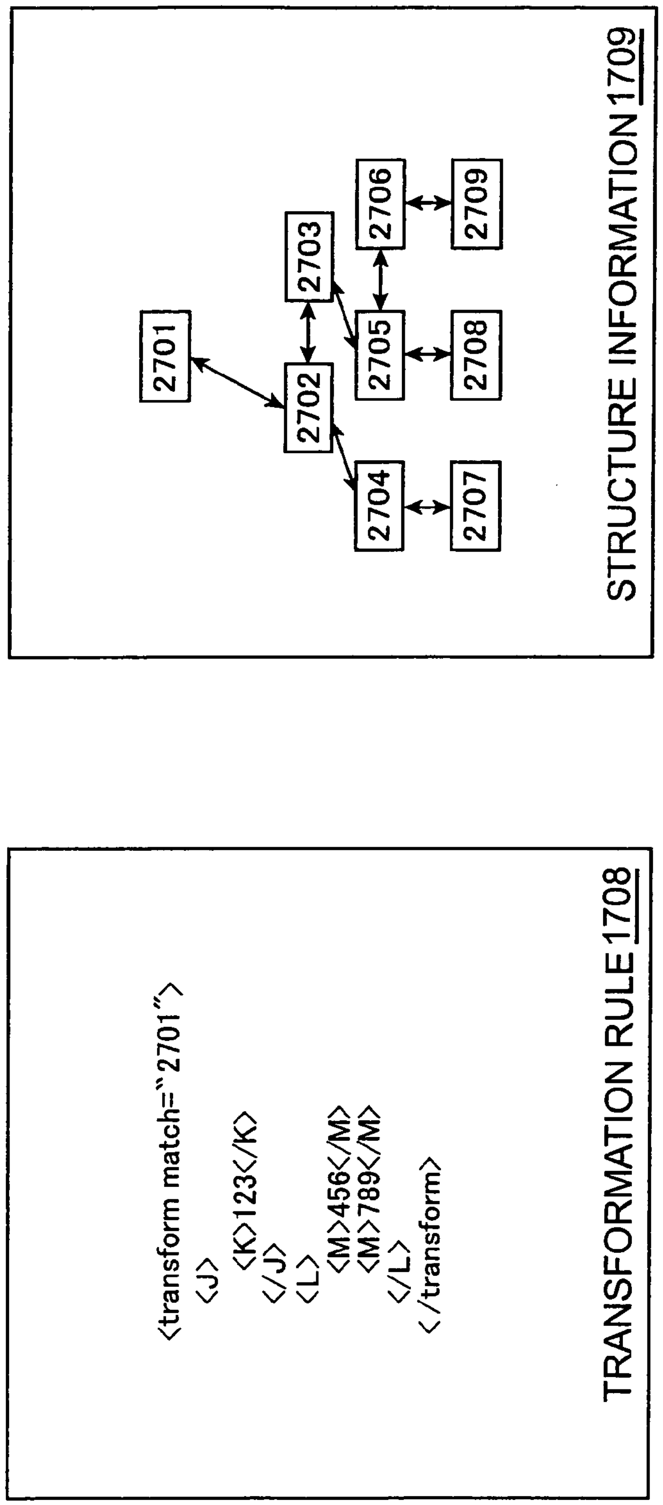
FIG. 27 is a diagram showing another example of a transformation rule and structure information extracted from the transformation rule.

The transformation rule replacer 1702 may also be configured to detect a template with a smallest difference from the structure information extracted from the transformation rule 1708 (the template will be referred to hereinafter as "approximate template"), from the storage 1701, extract difference information indicating the difference, and replace the replaced transformation rule 1710 with the approximate template and the difference information. An example of the transformation rule 1708 is shown in FIG. 27(*a*), and structure information 1709 extracted from the transformation rule 1708 shown in FIG. 27(*a*) is shown in FIG. 27 (*b*). For example, where the template stored in the storage 1701 is only the first template 515 described in FIG. 5(*b*), the transformation rule replacer 1702 compares the number of nodes in the pattern structure information with the number of nodes in the (extracted) structure information 1709 shown in FIG. 27 and, when they are equal, it detects the template as an approximate template. In this example, let us suppose a pattern in which node 509 is connected to ns of node 510 in the pattern structure information 505 of the first template 515 (the pattern supposed herein is not shown), and then the pattern matches the (extracted) structure information 1709 shown in FIG. 27.

Figure 28:
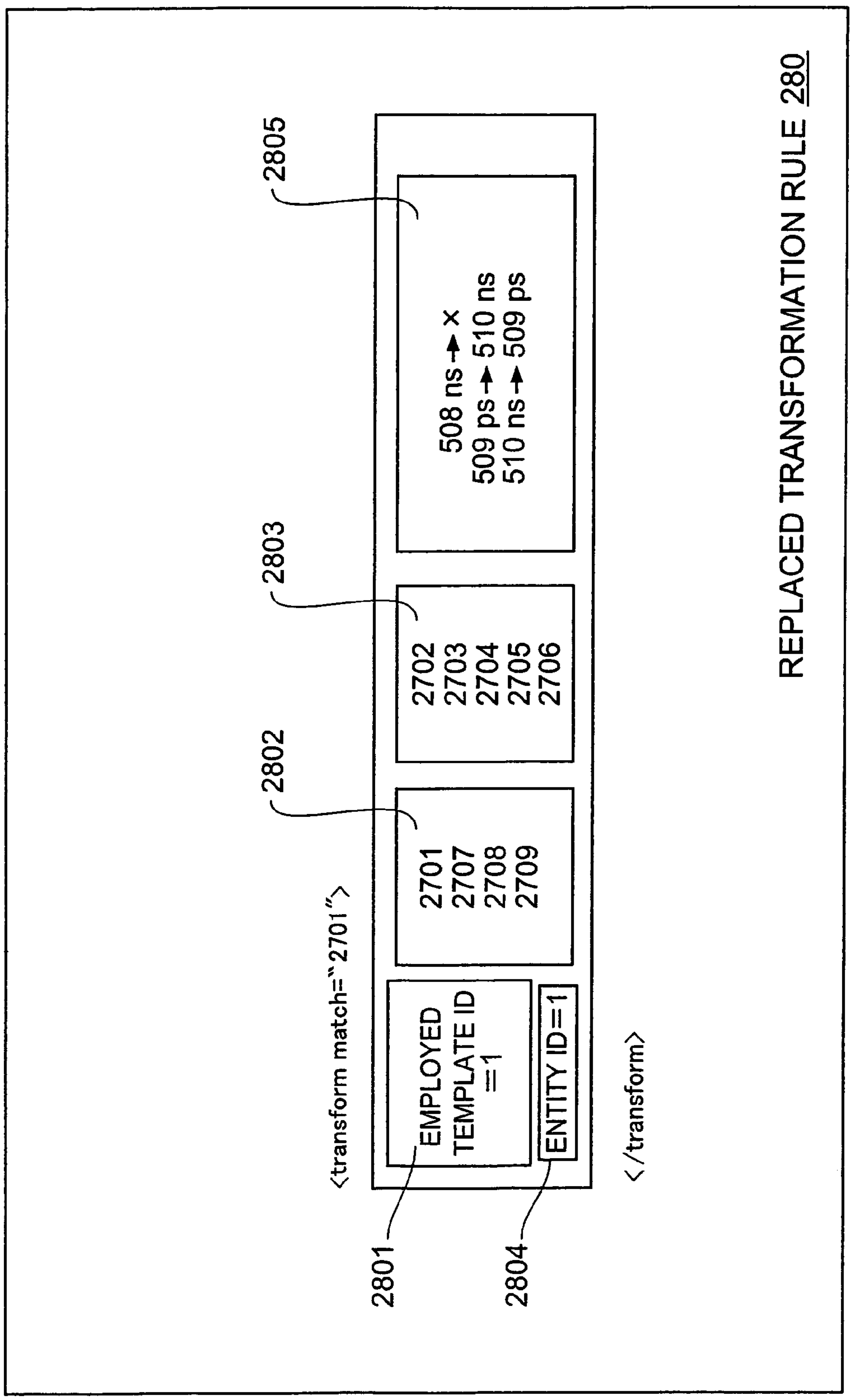
FIG. 28 is a diagram showing another replaced transformation rule.

FIG. 28 is a diagram showing an example of the replaced transformation rule obtained by replacing the transformation rule 1708 shown in FIG. 27(*a*), with the template. As shown in FIG. 28, the replaced transformation rule 280 resulting from the replacement with the template is comprised of an employed template ID 2801 indicating an identifier of the approximate template, entity connection information 2802 indicating external interfaces of the pattern structure information, entity node information 2803 indicating node numbers in the pattern structure information, an entity ID 2804 indicating an identifier of the template entity itself, and a template difference 2805 as difference information indicating the difference from the actual structure information. The employed template ID 2801, entity connection information 2802, entity node information 2803, and entity ID 2804 are the same in the form of use as the employed template ID 601, entity connection information 603, entity node information 604, and entity ID 602, respectively, forming the template entity 600 shown in FIG. 6. The template difference 2805 indicates, for example, how to switch between connections of respective nodes in the pattern structure information in the template.

Since the structure information 1709 shown in FIG. 27 (*b*) has the structure in which the node 509 in the pattern structure information 505 of the first template 515 shown in FIG. 5(*b*) is connected to ns of the node 510, it has information for disconnecting the connection of ns of the node 508 (the first line of the template difference 2805), information for connecting ps of the node 509 to ns of the node 510 (the second line of the template difference 2805), and information for connecting ns of the node 510 to ps of the node 509 (the third line of the template difference 2805).

As described above, the use of the approximate template enables efficient utilization of the template stored in the storage 1701, and reduces the needed capacity of the storage 1701.

Fourth Embodiment

Figure 18:
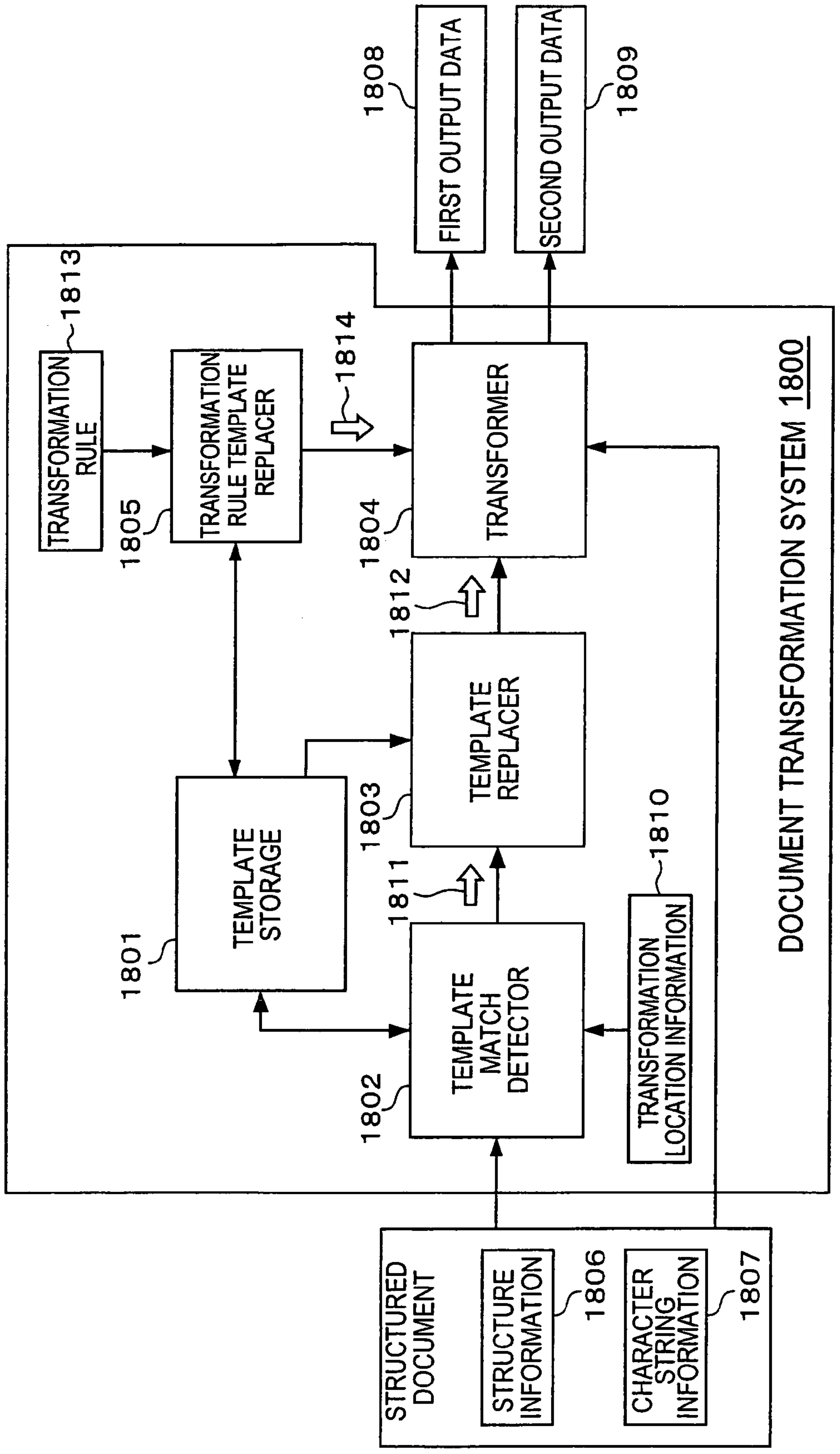
FIG. 18 is a block diagram showing a configuration of a document transformation system according to the fourth embodiment of the present invention.

FIG. 18 is a block diagram showing a configuration of a document transformation system 1800 according to the fourth embodiment. The document transformation system 1800 has a storage 1801, a match detector 1802, a replacer 1803, a transformer 1804, and a transformation rule replacer 1805. The document transformation system 1800 imports structure information 1806 and character string information 1807 of a structured document as an object of transformation, outputs transformed structure information as first output data 1808, and outputs transformed character string information as second output data 1809.

The storage 1801, similar to the storage 102 in the document transformation system 101 in the first embodiment (cf. FIG. 1), stores a specific pattern preliminarily defined, as a template. The template may be one having a specific pattern but not preliminarily defined, and may be extracted from a transformation rule by the discoverer 2401 described in the first embodiment (cf. FIG. 24).

The match detector 1802, similar to the match detector 103 in the document transformation system 101 in the first embodiment (cf. FIG. 1), imports the structure information 1806, and transformation location information 1810 indicating a transformation location for transformation by the transformer 1804 in the structure information 1806, detects a match portion between the structure information 1806 and the template stored in the storage 1801, excepting the transformation location indicated by the transformation location information 110, from objects of detection, and outputs match information 1811. The match detector 1802 performs the detection, for example, according to the match detection procedure shown in FIG. 23. The transformation location information 1810 can be extracted from the transformation rule by the transformation location detector 1112 in the second embodiment (not shown in FIG. 18, cf. FIG. 1). In another potential configuration not shown, the document transformation system 1800 may be provided with the transformation rule storage 1401 and transformation location detector 1403 in the document transformation system 1400 of the second embodiment and may be configured to extract a transformation location identifier stored in the transformation rule storage 1401, according to frequencies of use.

The match detection procedure shown in FIG. 23 is as follows. At step 10 after a start of processing, templates are selected one by one in order from one with the largest number of nodes out of the storage 1801, and the following processing is repeated. A selected template is denoted by Pj. Then the flow goes to step 11 to eliminate nodes as objects of transformation from the nodes included in the structure information, to define combinations of nodes in the number equal to the number of nodes of Pj, as X1, X2, . . . , Xm, and to select one out of them, and the following processing is repeated. A selected node combination is denoted by Xk.

Then the flow goes to step 12 to determine whether neither of the nodes in Xk has a replacement complete mark. When neither has a replacement complete mark, the flow goes to step 13; otherwise the processing is terminated without execution of subsequent steps 13, 14. At step 13, it is determined whether Pj and Xk are of the same type. When they are of the same type, the flow goes to step 14; otherwise the processing is terminated without execution of subsequent step 14. At step 14, Xk is registered as a template match portion, and the nodes in Xk are marked with a replacement complete mark.

The replacer 1803, similar to the replacer 104 in the document transformation system 101 of the first embodiment (cf. FIG. 1), imports the structure information 1806 and match information 1811, replaces the match portion indicated by the match information 1811 in the structure information 1806, with the template, and outputs replaced structure information 1812.

The transformation rule replacer 1805, similar to the transformation rule replacer 1702 in the third embodiment (cf. FIG. 17), imports a transformation rule 1813 containing a transformed, structured document. Then the transformation rule replacer 1805 extracts the structure information of the transformed, structured document from the input transformation rule 1813, detects a template matching the extracted structure information, from the storage 1801, replaces the structure information with the template, and transmits (or feeds) it as a replaced transformation rule 1814 to the transformer 1804.

The transformer 1804, similar to the transformer 1703 in the third embodiment (cf. FIG. 17), imports the structure information 1806, character string information 1807, and replaced transformation rule 1814, transforms the structure information 1806 and character string information 1807 according to the replaced transformation rule 1814, outputs transformed structure information as first output data 1808, and outputs transformed character string information as second output data 1809.

The structure information 1806 has a configuration similar to the aforementioned structure information 12 shown in FIG. 4(*a*). The character string information 1807 is listed like the aforementioned table 13 shown in FIG. 4(*b*). The transformation rule 1813 has a configuration similar to the aforementioned transformation rule 120 shown in FIG. 12. The storage 1801 is assumed to store the first template 515 shown in FIG. 5(*b*), and the second template 900 shown in FIG. 9. "312 " is preliminarily set as transformation location information 1810.

In this example, the match information 1811 outputted from the match detector 1802 is the nodes 302, 310, and the replaced structure information 1812 outputted from the replacer 1803 is the replaced structure information 300 shown in FIG. 7. Furthermore, the replaced transformation rule 1814 outputted from the transformation rule replacer 1805 is like the replaced transformation rule 171 shown in FIG. 21. The first output data 1808 outputted from the transformer 1804 is the transformed structure information 360 shown in FIG. 10, and the second output data 1809 is the transformed character string information as the list of the table 23 shown in FIG. 13.

The configuration as described above permits the template stored in the storage 1801 to be used as a template for replacement of the structure information 1806 and as a template for replacement of the transformation rule 1813. If the match detector 1802 uses the match detection procedure shown in FIG. 23, the template stored in the storage 1801 can be an on-memory template loaded on a memory, and the template included in the replaced transformation rule 1814 in the transformer 1804 can be the on-memory template. For this reason, the transformer 1804 can increase the template readout time and thus raise the processing speed.

This configuration permits the first output data 1808 to be outputted in a form in which the template is applied to both the structure information remaining as not transformed by the transformer 1804, and the transformed structure information. Namely, without need for a recompression process of again applying the template to the first output data 1808 to effect compression, in order to compress the transformed structure information described in the first embodiment, the structure information remaining without being transformed, and the transformed structure information can be simultaneously compressed by simply letting them pass through the transformer 1804.

The disclosure of Japanese Patent Application No. 2003-332389 filed Sep. 24. 2003 including specification, drawings and claims is incorporated herein by reference in its entirety.

What is claimed is:

1. A document transformation system for transforming a structured document having structure information and character string information, comprising:

template storing means for storing structure information having a specific pattern, as a template;

template match detecting means for importing the structure information forming the structured document, and transformation location information indicating a transformation location of the structure information, and for detecting a match portion between the structure information and the template, with the exception of the transformation location indicated by the transformation location information, from objects to be matched, in the structure information;

template replacing means for importing the structure information forming the structured document, and match information indicating the match portion, for replacing the match portion indicated by the match information, in the structure information with the template, and for outputting replaced structure information; and transforming means for importing the character string information forming the structured document, the replaced structure information, and a transformation rule for transformation of the structure information and character string information forming the structured document, for transforming the replaced structure information and the character string information thus imported, according to the transformation rule, and for outputting transformed structure information and transformed character string information.

2. The document transformation system according to claim 1, wherein the transformation rule comprises a transformation location identifier, the document transformation system further comprising:

transformation location detecting means for detecting the transformation location identifier as the transformation location information from the transformation rule, and for feeding the transformation location identifier thus detected, to the match detecting means.

3. The document transformation system according to claim 1, wherein the transformation rule comprises a transformation location identifier, the document transformation system further comprising:

transformation rule storing means for storing the transformation location identifier in the transformation rule; and transformation location detecting means for detecting the transformation location information, according to a frequency of use of the transformation location identifier stored in the transformation rule storing means.

4. The document transformation system according to claim 1, wherein the transformation rule comprises a transformation location identifier, the document transformation system further comprising:

transformation rule storing means for storing the transformation location identifier in the transformation rule; and transformation location detecting means for detecting the transformation location identifier stored in the transformation rule storing means, as the transformation location information.

5. The document transformation system according to claim 1, wherein the transformation rule comprises a transformed, structured document, the document transformation system further comprising:

template discovering means for extracting structure information of the transformed, structured document from the transformation rule, and for making the template storing means store the structure information as the template.

6. The document transformation system according to claim 5, further comprising template verifying means for determining whether it is necessary to store the template discovered by the template discovering means, wherein the template discovering means stores the template, according to a determination made by the template verifying means.

7. The document transformation system according to claim 6, wherein the template verifying means determines whether it is necessary to store the template, based on whether a template of the same type as the template discovered by the template discovering means is stored in the template storing means.

8. The document transformation system according to claim 1, wherein the template match detecting means detects a match portion between the transformed structure information and the template, and wherein the template replacing means replaces the match portion indicated by the match information outputted from the template match detecting means, with the template.

9. A document transformation system for transforming a structured document having structure information and character string information, comprising:

template storing means for storing structure information having a specific pattern, as a template;

transformation rule template replacing means for importing a transformation rule comprising a transformed, structured document, for transformation of the structure information and character string information forming the structured document, for extracting structure information of the transformed, structured document from the transformation rule, for detecting the template matching the structure information, and for outputting a replaced transformation rule in which the structure information is replaced with the detected template; and transforming means for importing the structure information and character string information forming the structured document, and the replaced transformation rule, for transforming the structure information and character string information thus imported, according to the replaced transformation rule, and for outputting transformed structure information and transformed character string information.

10. The document transformation system according to claim 9, wherein the transformation rule template replacing means detects an approximate template with a smallest difference from the structure information of the transformed, structured document, extracts difference information indicating the difference, and replaces the replaced transformation rule with the difference information and the approximate template.

11. A document transformation system for transforming a structured document having structure information and character string information, comprising:

template storing means for storing structure information having a specific pattern, as a template;

template match detecting means for importing the structure information forming the structured document, and transformation location information indicating a transformation location of the structure information, and for detecting a match portion between the structure information and the template, with the exception of the transformation location indicated by the transformation location information, from objects to be matched, in the structure information;

template replacing means for importing the structure information forming the structured document, and match information indicating the match portion, for replacing the match portion indicated by the match information, in the structure information with the template, and for outputting replaced structure information;

transformation rule template replacing means for importing a transformation rule comprising a transformed, structured document, for transformation of the structure information and character string information forming the structured document, for extracting structure information of the transformed, structured document from the transformation rule, for detecting the template matching the structure information, and for outputting a replaced transformation rule in which the structure information is replaced with the detected template; and transforming means for importing the character string information forming the structured document, the replaced structure information, and the replaced transformation rule, for transforming the replaced structure information and the character string information thus imported, according to the replaced transformation rule, and for outputting transformed structure information and transformed character string information.

* * * * *